(12) United States Patent
Alvarez et al.

(10) Patent No.: US 8,679,442 B2
(45) Date of Patent: Mar. 25, 2014

(54) FULLERENE COMPOSITIONS AND METHODS FOR PHOTOCHEMICAL PURIFICATION

(75) Inventors: Pedro J. J. Alvarez, Houston, TX (US); Jaesang Lee, Houston, TX (US); Lon J. Wilson, Houston, TX (US); Yuri Mackeyev, Houston, TX (US); Jaehong Kim, Alpharetta, GA (US)

(73) Assignees: William Marsh Rice University, Houston, TX (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/380,606

(22) PCT Filed: Jun. 24, 2010

(86) PCT No.: PCT/US2010/039833
§ 371 (c)(1),
(2), (4) Date: Apr. 6, 2012

(87) PCT Pub. No.: WO2010/151679
PCT Pub. Date: Dec. 29, 2010

(65) Prior Publication Data
US 2012/0189492 A1    Jul. 26, 2012

Related U.S. Application Data

(60) Provisional application No. 61/220,093, filed on Jun. 24, 2009, provisional application No. 61/256,043, filed on Oct. 29, 2009.

(51) Int. Cl.
*B01J 19/08* (2006.01)

(52) U.S. Cl.
USPC ......... 423/445 B; 977/903; 977/737; 977/738

(58) Field of Classification Search
USPC ........ 423/445 B, DIG. 40; 977/903, 737, 738
See application file for complete search history.

(56) References Cited

U.S. PATENT DOCUMENTS

| 7,341,972 B2 | 3/2008 | Jensen et al. |
| 2003/0065206 A1 | 4/2003 | Bolskar et al. |

(Continued)

FOREIGN PATENT DOCUMENTS

EP    1973142 A1    9/2008

OTHER PUBLICATIONS

Photochemical and Antimicrobial Properties of Novel C60 Derivatives in Aqueous Systems Jaesang Lee, Yuri Mackeyev, Min Cho, Dong Li, Jae-Hong Kim, Lon J. Wilson, and Pedro J. J. Alvarez Environmental Science & Technology 2009 43 (17), 6604-6610.*

(Continued)

*Primary Examiner* — Stanley Silverman
*Assistant Examiner* — Richard M Rump
(74) *Attorney, Agent, or Firm* — Winstead PC

(57) ABSTRACT

In various embodiments, the present disclosure describes fullerene derivatives that are capable of photocatalytically generating reactive oxygen species in the presence of ultraviolet and/or visible light. In some embodiments, the fullerene derivatives are aminofullerenes containing a plurality of amine-terminated moieties covalently bonded to the fullerene cage. The fullerene derivatives may optionally be covalently bonded to a substrate surface for use in photocatalytic disinfection systems for removing various contaminants including, for example, bacteria, viruses, protozoa and chemical pollutants. Methods using the present fullerene and aminofullerene derivatives in various purification processes are also described herein.

9 Claims, 11 Drawing Sheets

(56) References Cited

U.S. PATENT DOCUMENTS

2004/0068207 A1* 4/2004 Tabata .............................. 601/2
2004/0219057 A1   11/2004 Golden
2009/0076115 A1    3/2009 Wharton et al.

OTHER PUBLICATIONS

Synthesis and Characterization of Water-Soluble Amino Fullerene Derivatives Christine F. Richardson, David I. Schuster, and, and Stephen R. Wilson Organic Letters 2000 2 (8), 1011-1014.*

Chia-Hung Lee, Tien-Sung Lin, Hong-Ping Lin, Qi Zhao, Shang-Bin Liu, Chung-Yuan Mou, High loading of C60 in nanochannels of mesoporous MCM-41 materials, Microporous and Mesoporous Materials, vol. 57, Issue 2, Jan. 16, 2003, pp. 199-209, ISSN 1387-1811, 10.1016/S1387-1811(02)00591-7.*

Alvaro, M. et al. "Photochemistry of single wall carbon nanotubes embedded in a mesoporous silica matrix" Chem. Commun., 2002, 3004-3005.*

Davydenko, M. O., et al. "Sensibilization of fullerene C60 immobilized at silica nanoparticles for cancer photodynamic therapy". Journal of Molecular Liquids 127 (2006) 145-147.*

* cited by examiner

FULLERENE COMPOSITIONS AND METHODS FOR PHOTOCHEMICAL PURIFICATION

CROSS-REFERENCE TO RELATED APPLICATIONS

This application claims priority to U.S. Provisional Patent Applications 61/220,093, filed Jun. 24, 2009, and 61/256,043, filed Oct. 29, 2009, each of which is incorporated by reference herein in its entirety.

STATEMENT REGARDING FEDERALLY SPONSORED RESEARCH

This invention was made with Government support under grant numbers CBET-0829158 and EEC-0647452 awarded by the National Science Foundation. The Government has certain rights in the invention.

BACKGROUND

Buckminsterfullerene ($C_{60}$) has been shown to have a number of useful photophysical properties that have led to proposed uses including, for example, photoconductive, photochemical and photovoltaic devices, as well as photodynamic therapy. Upon irradiation, the ground state of $C_{60}$ becomes an excited singlet state ($^1C_{60}$), which subsequently converts to an excited triplet state ($^3C_{60}$) in unit quantum yield through intersystem crossing. In the presence of dissolved oxygen, energy transfer from the $C_{60}$ triplet state to the dissolved oxygen results in efficient production of singlet oxygen ($^1O_2$). In addition the $C_{60}$ triplet state can be reduced to a $C_{60}$ radical anion ($C_{60}{}^{-}$) in the presence of electron donors such as, for example, amines and alcohols. The $C_{60}$ radical anion, in turn, can reduce dissolved oxygen to form a superoxide radical anion ($O_2{}^{-}$). FIGS. 1A and 1B present schematics showing various processes through which $C_{60}$ can produce reactive oxygen species (singlet oxygen and superoxide radical anion) under irradiation conditions.

Efforts to harness the photophysical properties of $C_{60}$ for environmental and biomedical applications have been hampered by its low aqueous solubility. Although aqueous solubility can be addressed by functionalization, the photophysical activity of functionalized $C_{60}$ is substantially reduced or eliminated in many instances due to aggregation in solution. Aggregation in solution generally results in contact between the fullerene cages of adjacent $C_{60}$ moieties, resulting in photoquenching of the triplet state.

Various functionalized $C_{60}$ derivatives have been proposed for biomedical therapeutic applications including, for example, tumor growth inhibition, DNA cleavage, and antimicrobial activity against HIV-1. For environmental applications, it has been shown that under UV irradiation, fullerols (e.g., multiple-hydroxylated $C_{60}$) can be used to form reactive oxygen species, which can subsequently inactivate MS-2 bacteriophage and other pathogens, as well as destroy chemical pollutants. However, it has not been heretofore demonstrated that microbial, viral or other pathogen inactivation can occur in the presence of visible light, which would enable the use of the sun as a natural light source to affect photochemical purification and environmental remediation. Furthermore, catalytic reuse of fullerene derivatives bound to a substrate surface has not yet been demonstrated in environmental applications.

In view of the foregoing, $C_{60}$ derivatives and substrate-bound variants thereof would demonstrate substantial utility for photochemical removal of contaminants from various sources, provided that successful generation of reactive oxygen species can be achieved in such functionalized $C_{60}$ derivatives. Compositions containing such $C_{60}$ derivatives would have particular utility in water and air purification to remove a number of biological and chemical contaminants, while using only atmospheric oxygen and light in the purification process.

SUMMARY

In some embodiments, fullerene derivatives operable for photocatalytically generating singlet oxygen in the presence of a visible light source are described herein.

In some embodiments, photocatalytic disinfection systems containing a substrate surface and at least one fullerene derivative covalently bonded to the substrate surface are described herein. The at least one fullerene derivative is operable for forming at least one reactive oxygen species in the presence of a light source. In some embodiments, the photocatalytic disinfection systems further contain an ultraviolet or visible light source.

In other various embodiments, methods for using the present fullerene derivatives in photochemical purification processes are described herein. In some embodiments the methods include providing a composition containing at least one fullerene derivative that is operable for forming at least one reactive oxygen species in the presence of a light source, exposing the composition to a material containing at least one contaminant, and irradiating the composition with a light source to generate at least one reactive oxygen species. The at least one reactive oxygen species reacts with the at least one contaminant.

In some embodiments, the methods include providing a composition containing at least one aminofullerene covalently bonded to a substrate surface, exposing the composition to a material containing at least one contaminant, and irradiating the composition with a light source to generate at least one reactive oxygen species that reacts with the at least one contaminant. The at least one aminofullerene is operable for forming at least one reactive oxygen species in the presence of a light source. The at least one aminofullerene has a structure of

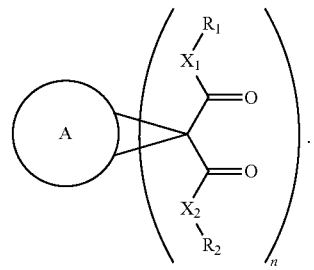

A represents a $C_{2m}$ fullerene cage, where m is greater than or equal to 30. $X_1$ and $X_2$ are independently O or $NR_3$, where $R_3$ is H, alkyl, cycloalkyl, aryl, heteroaryl, or aralkyl. $R_1$ and $R_2$ contain at least one terminal amino group and are independently alkyl, alkenyl, alkynyl, cycloalkyl, heterocyclyl, aryl, heteroaryl, or aralkyl groups. Variable n is an integer ranging from 1 to an upper limit equal to half the number of hexagons in the $C_{2m}$ fullerene cage.

In some embodiments, methods of the present disclosure include providing a composition containing at least one aminofullerene covalently bonded to a substrate surface, exposing the composition to a material containing at least one contaminant, and irradiating the composition with a visible light source to generate at least one reactive oxygen species. The at least one aminofullerene contains $C_{60}$ and a plurality of amine-terminated moieties covalently bonded to the $C_{60}$. The at least one aminofullerene is operable for forming at least one reactive oxygen species in the presence of a visible light source.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1A:
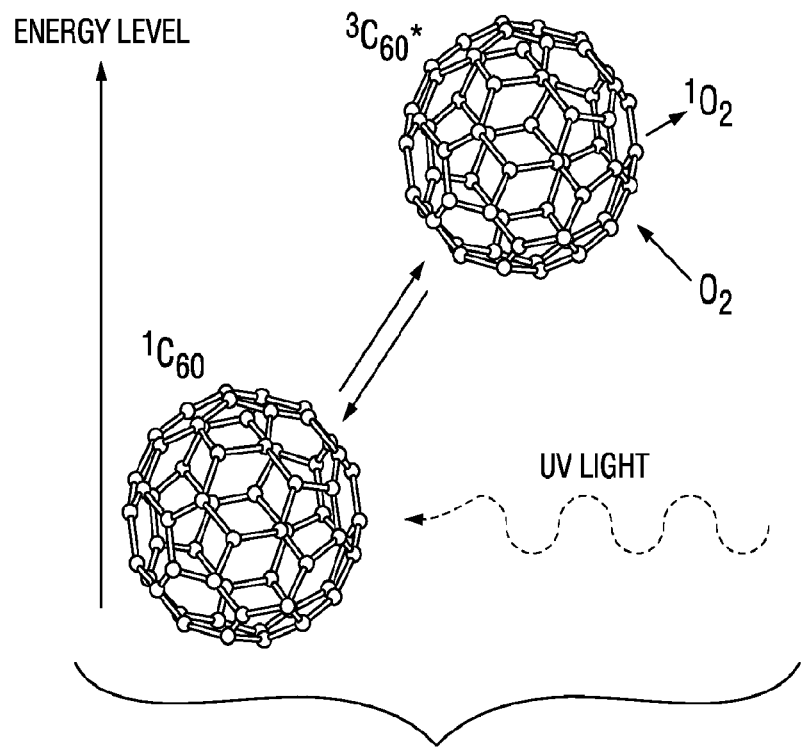
FIGS. 1A and 1B present schematics showing various processes through which $C_{60}$ can produce reactive oxygen species (singlet oxygen and superoxide radical anion) under irradiation conditions.
Figure 1B:
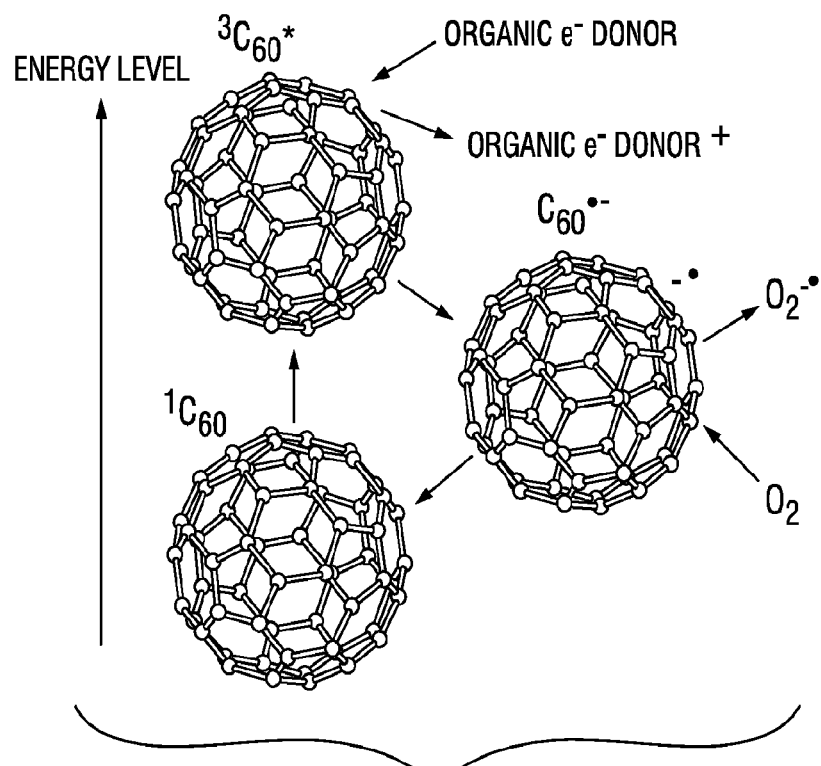

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

The following definitions are set forth to aid in understanding of the various embodiments of the present disclosure. Terms in addition to those below are defined, as required, throughout the Detailed Description.

"Alkyl and cycloalkyl," as used herein, respectively refer to carbon chains and rings having all saturated carbon-carbon bonds. Alkyl groups of the present disclosure contain from 1 to about 20 carbon atoms and may be linear or branched. Cycloalkyl groups of the present disclosure may be monocyclic or multi-cyclic and contain from 3 to about 20 carbon atoms. Alkyl and cycloalkyl groups may further be substituted with heteroatom functionality (e.g., halogens, alcohols, thiols, ethers, thioethers, aldehydes, ketones, amines, carboxylic acids, esters, amides, nitriles, and like functionality). Heteroatom functionality (e.g., N, O or S from, for example, alcohols, thiols, ethers, thioethers or amines) may replace a carbon atom in the chain of alkyl groups. In such heteroatom-substituted alkyl groups, all of the carbon-carbon or carbon-heteroatom bonds remain saturated.

"Heterocyclyl," as used herein, refers to a cycloalkyl group having at least one ring carbon atom replaced with a heteroatom (e.g., N, O or S from, for example, alcohols, thiols, ethers, thioethers or amines).

"Alkenyl and alkynyl," as used herein, refer to linear or branched carbon chains having at least one carbon-carbon double bond (alkenyl) or carbon-carbon triple bond (alkynyl). Alkenyl and alkynyl groups of the present disclosure contain from 2 to about 20 carbon atoms and may be further substituted with heteroatom functionality, as noted above.

"Aryl," as used herein, refers to aromatic monocylic or multi-cyclic rings having from 6 to about 20 carbon atoms. Aryl groups of the present disclosure may be further substituted with heteroatom functionality, as noted above.

"Heteroaryl," as used herein, refers to monocyclic or multi-cyclic aromatic rings containing at least 1 to about 4 heteroatoms (e.g., O, N, S) and about 4 to about 20 carbon atoms. Heteroaryl groups of the present disclosure may be further substituted with heteroatom functionality, as noted above.

"Aralkyl," as used herein, refers to an alkyl group having at least one of its hydrogen atoms replaced with an aromatic group. Aralkyl groups of the present disclosure may be further substituted with heteroatom functionality, as noted above.

In various embodiments, the present disclosure describes fullerene derivatives that are operable for generating reactive oxygen species such as, for example, singlet oxygen or superoxide radical anions in the presence of light sources such as, for example, ultraviolet and/or visible light sources. In various embodiments, the fullerene derivatives are aminofullerene derivatives containing a terminal amino group that may be covalently bonded to a substrate surface through an amide bond, for example. When covalently bonded to a substrate surface, the fullerene or aminofullerene derivatives are still operable for generating reactive oxygen species. The reactive oxygen species may be subsequently used in various purification processes for media including, for example, air and water to remove contaminants therefrom (e.g., bacterial and viral pathogens and chemical impurities). Photocatalytic disinfection systems containing the present fullerene derivatives and methods for use thereof are also described herein.

In general, aminofullerenes of the present disclosure have the following structure:

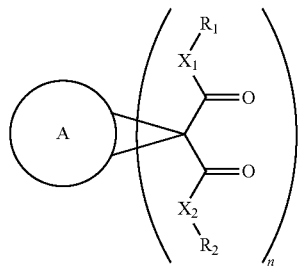

where A represents a $C_{2m}$ fullerene cage, where m is greater than or equal to 30, and $X_1$ and $X_2$ are independently O or $NR_3$, where $R_3$ is H, alkyl, cycloalkyl, aryl, heteroaryl, or aralkyl. $R_1$ and $R_2$ contain at least one terminal amino group and are independently alkyl, alkenyl, alkynyl, cycloalkyl, heterocyclyl, aryl, heteroaryl, or aralkyl groups. In various embodiments, the at least one terminal amino group of $R_1$ and $R_2$ may by primary, secondary or tertiary.

In some embodiments, variable n is an integer ranging between 1 and an upper limit equal to half the number of hexagons (e.g., 6-membered rings) in the $C_{2m}$ fullerene cage. For example, in $C_{60}$ there are 20 hexagons, and n ranges between 1 and 10. In larger fullerene cages, there are more hexagons, and the upper limit of n is accordingly higher. Depending on the chosen fullerene, one of ordinary skill in the art will readily be able to determine the number of hexagons therein in order to establish the upper limit of variable n. Variable n ranges between 1 and 10 in some embodiments or between 1 and 6 in other embodiments.

In some embodiments, $X_1$ and $X_2$ are the same, while in other embodiments $X_1$ and $X_2$ are different. In some embodiments, $R_1$ and $R_2$ are the same, while in other embodiments, $R_1$ and $R_2$ are different. In still other embodiments, $R_1$ and $R_2$ are the same, and $X_1$ and $X_2$ are the same.

In some embodiments, the present disclosure describes fullerene derivatives that are operable for photocatalytically generating singlet oxygen in the presence of a visible light source. In some embodiments, the fullerene derivatives are $C_{60}$ (buckminsterfullerene) derivatives [e.g., $(C_{60}-I_h)[5,6]$ fullerene derivatives]. However, in other embodiments, the fullerene derivatives may contain higher fullerenes such as, for example, $C_{70}$, $C_{76}$, $C_{78}$, $C_{82}$ and $C_{84}$. In some embodiments, the fullerene derivatives contain fullerene cages having a carbon count between sixty carbons (e.g., $C_{60}$) and 120 carbons (e.g., $C_{120}$). In general, the fullerene derivatives contain fullerene cages having a carbon count of $C_{2m}$, where m is an integer greater than or equal to 30. In various embodiments, the fullerene cages of the present fullerene derivatives are not hydroxylated.

Fullerene derivatives of the present disclosure may contain any number of substituents up to the maximum allowed by the chosen fullerene cage (e.g., an upper limit equal to half the number of hexagons in the fullerene cage). However, in many embodiments of the present disclosure, the fullerene derivatives contain fewer substituents than the maximum allowed amount. In some embodiments, the fullerene derivatives are hexakis-substituted fullerene derivatives, meaning that they contain six substituents covalently bonded to the fullerene cage. In embodiments in which the fullerene is $C_{60}$, hexakis-substituted $C_{60}$ fullerene derivatives generally possess a highly symmetrical structure and are easily isolated and characterized spectroscopically. In some embodiments, illustrative hexakis-substituted $C_{60}$ fullerene derivatives may include the following, for example:

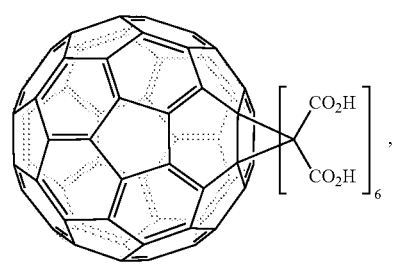

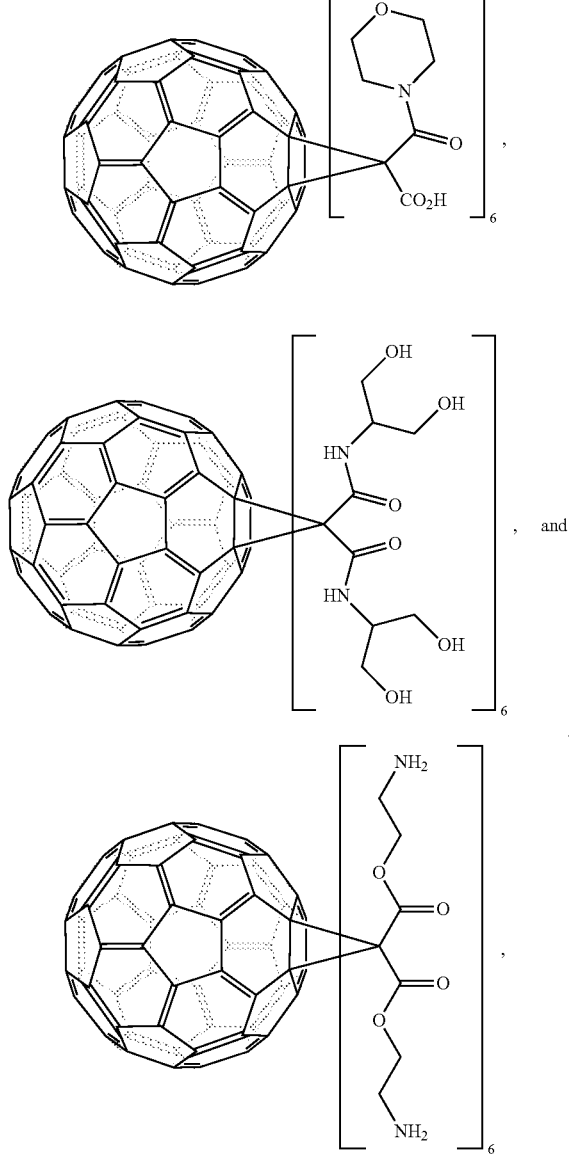

Various salts and combinations of the aforesaid fullerene derivatives also lie within the spirit and scope of the present disclosure. For example, in various embodiments, one or more amines of hexakis-substituted $C_{60}$ derivative 4 may exist in a salt form (e.g., chloride or trifluoroacetate).

The embodiments of the present disclosure are by no means limited to hexakis-substituted fullerene derivatives. In some embodiments, the fullerene derivatives are mono-substituted fullerene derivatives (e.g., mono-substituted $C_{60}$ derivatives). In some embodiments, the fullerene derivatives are di-substituted fullerene derivatives (e.g., di-substituted $C_{60}$ derivatives). In some embodiments, the fullerene derivatives are tri-substituted fullerene derivatives (e.g., tri-substituted $C_{60}$ derivatives). In some embodiments, the fullerene derivatives are tetrakis-substituted fullerene derivatives (e.g., tetrakis-substituted $C_{60}$ derivatives). In some embodiments, the fullerene derivatives are pentakis-substituted fullerene derivatives (e.g., pentakis-substituted $C_{60}$ derivatives). For example, bis- and tetrakis-substituted variants of hexakis-subsituted $C_{60}$ derivatives 1-4 also demonstrate the capacity for generating singlet oxygen during irradiation. In general, any substituted fullerene derivative having a number of substituents between 1 and an upper limit equal to half the number of hexagons in the fullerene cage may be utilized in the various embodiments described herein.

In some embodiments, the fullerene derivatives of the present disclosure are aminofullerenes containing $C_{60}$ and a plurality of amine-terminated moieties covalently bonded to the $C_{60}$. In some embodiments, the aminofullerenes are $C_{60}$ derivatives containing between 1 and 6 substitutents. In some embodiments, the aminofullerene is hexakis-substituted $C_{60}$ derivative 4. However, as previously set forth hereinabove, a wide variety of aminofullerenes lie within the spirit and scope of the present disclosure.

In some embodiments, the fullerene derivatives may further be covalently bonded to a substrate surface such as, for example, a polymer, metal or silica gel surface. In some embodiments, at least one terminal amino group of an aminofullerene may be covalently bonded to a substrate surface. For example, in some embodiments, terminal amino group(s) of aminofullerenes may be covalently bonded to a substrate surface through amide bond(s) between the aminofullerene and the substrate surface. One of ordinary skill in the art will appreciate that there are many ways in which fullerene derivatives might become covalently bonded to a substrate surface, and the illustrative examples presented herein should not be construed as limiting.

In some embodiments, photocatalytic disinfection systems containing fullerene derivatives are described herein. In various embodiments, the photocatalytic disinfection systems include a substrate surface and at least one fullerene derivative covalently bonded to the substrate surface. The at least one fullerene derivative is operable for forming at least one reactive oxygen species in the presence of a light source. In some embodiments, the photocatalytic disinfection systems further include a visible light source.

In some embodiments, the photocatalytic disinfection systems further include a visible light source. The visible light source emits wavelengths between about 400 nm and about 700 nm in some embodiments or between about 400 nm and about 550 nm in other embodiments. Illustrative visible light sources include, for example, tungsten lamps and other incandescent light sources, mercury vapor lamps, light-emitting diodes, arc discharge lamps and lasers. In some embodiments, the visible light source is predominantly a line source such as, for example, a laser. In other embodiments, the visible light source is a broad spectrum emitter such as, for example, an incandescent light source. In some embodiments, the visible light source is the sun.

In some embodiments, the photocatalytic disinfection systems further include an ultraviolet light source. In some embodiments, the ultraviolet light source emits wavelengths between about 10 nm and about 400 nm. In general, ultraviolet wavelengths below about 200 nm are referred to as the vacuum ultraviolet, since these wavelengths are strongly absorbed by air. In some embodiments of the present disclosure, the ultraviolet light source emits wavelengths between about 200 nm and about 400 nm. Illustrative ultraviolet light sources include, for example, ultraviolet fluorescent lamps [e.g., black light blue (BLB) lamps], low pressure mercury vapor lamps, light emitting diodes, lasers and arc discharge lamps. In some embodiments, the ultraviolet light source is predominantly a line source such as, for example, a laser. In other embodiments, the ultraviolet light source is a broad spectrum emitter.

In some embodiments, the photocatalytic disinfection systems further include a mixed light source including both ultraviolet and visible light. In some embodiments, the mixed light source includes two or more separate light sources such as, for example, two or more lamps or lasers. In other embodiments, the mixed light source is a single light source emitting light in both the ultraviolet and visible regions of the electromagnetic spectrum. In some embodiments, the mixed light source is the sun.

Reactive oxygen species include, for example, singlet oxygen, superoxide radical anions, hydroxyl radicals, and hydrogen peroxide. In general, the fullerene derivatives of the present disclosure are operable for generating singlet oxygen upon exposure to a light source, as will be shown hereinafter in the experimental examples. In some embodiments, the fullerene derivatives are operable for photocatalytically generating singlet oxygen in the presence of ultraviolet light. In other embodiments, the fullerene derivatives are operable for photocatalytically generating singlet oxygen in the presence of visible light. Visible light generation of reactive oxygen species (e.g., singlet oxygen) represents a particular advantage of the present fullerene derivatives and photocatalytic disinfection systems, as the solar spectrum may be used in an embodiment to generate reactive oxygen species. Use of the solar spectrum to generate reactive oxygen species advantageously allows the present fullerene derivatives and photocatalytic disinfection systems to be used in the absence of an external power supply for a light source, which is not possible when conventional photocatalysts are used. Production of reactive oxygen species in the presence of visible light particularly distinguishes the present fullerene derivatives over conventional photocatalysts such as, for example, $TiO_2$ that are commonly used in photocatalytic disinfection systems.

In various embodiments of the photocatalytic disinfection systems, the at least one fullerene derivative is a $C_{60}$ derivative. However, as discussed hereinabove, a wide variety of fullerene derivatives may be utilized in the present photocatalytic disinfection systems. In some embodiments, the at least one fullerene derivative may contain a higher fullerene such as, for example, a derivative of $C_{70}$, $C_{76}$, $C_{78}$, $C_{82}$ or $C_{84}$. In some embodiments, the at least one fullerene derivative may have a fullerene cage having a carbon count between sixty carbons (e.g., $C_{60}$) and 120 carbons (e.g., $C_{120}$, or, more generally, the fullerene cage of the at least one fullerene derivative may have $C_{2m}$ carbons, where m is greater than or equal to 30. In various embodiments of the present photocatalytic disinfection systems, the at least one fullerene derivative contain fullerene cages that are not hydroxylated.

In some embodiments of the photocatalytic disinfection systems, the at least one fullerene derivative is a single fullerene derivative. In some embodiments, the at least one fullerene derivative is a mono-substituted fullerene derivative. In some embodiments, the at least one fullerene derivative is a di-substituted fullerene derivative. In some embodiments, the at least one fullerene derivative is a tri-substituted fullerene derivative. In some embodiments, the at least one fullerene derivative is a tetrakis-substituted fullerene derivative. In some embodiments, the at least one fullerene derivative is a pentakis-substituted fullerene derivative. In some embodiments, the at least one fullerene derivative is a hexakis-substituted fullerene derivative. In other embodiments, the at least one fullerene derivative of the present photocatalytic disinfection systems is a mixture of fullerene derivatives (e.g., a mixture of at least two different substituted fullerene derivatives, each containing different numbers of substitutents). In some embodiments, such mixtures of fullerene derivatives contain fullerenes each having between 1 and about 30 substituents on the fullerene cages. In various embodiments, the substituents may contain terminal functional groups operable for forming covalent bonds with suitable functional groups on a substrate surface. For example, alkyl, alkenyl, alkynyl, cycloalkyl, aryl, heteroaryl or aralkyl groups terminated with carboxylic acid, amine, hydroxyl or like functional groups may readily react with complementary functional groups on a substrate surface. In some or other embodiments, the substitutents on the fullerene derivatives may also contain functional groups having an affinity toward a particular microorganism or virus, which may allow for selective pathogenic targeting under photocatalytic disinfection conditions.

In some embodiments of the photocatalytic disinfection systems, the at least one fullerene derivative is a hexakis-substituted $C_{60}$ derivative such as, for example,

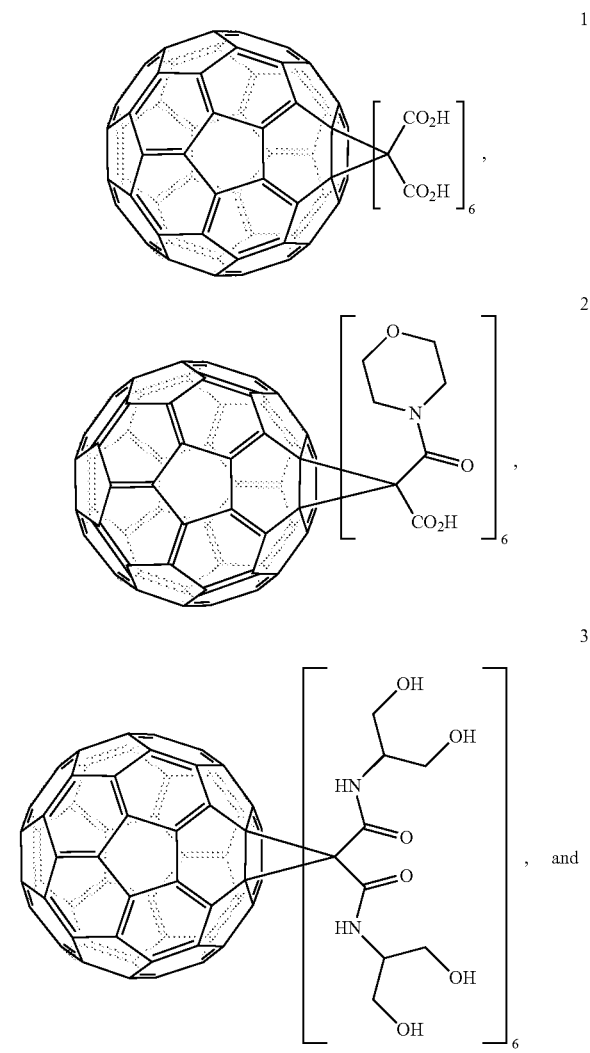

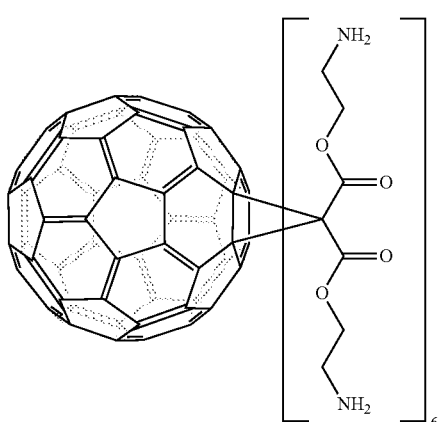

including various salts (e.g., chloride or trifluoroacetate) and combinations thereof. In some embodiments, the at least one fullerene derivative of the photocatalytic disinfection systems is at least one aminofullerene containing $C_{60}$ and a plurality of amine-terminated moieties covalently bonded to the $C_{60}$ (e.g., hexakis-substituted $C_{60}$ derivative 4). In general, the aminofullerenes of the present photocatalytic disinfection systems may have the following generic structure:

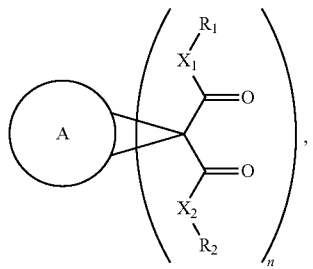

where the variables are defined as previously set forth hereinabove.

In some embodiments, the substrate surface of the present photocatalytic disinfection systems may be, for example, a polymer, a metal or a silica surface. In some embodiments of the photocatalytic disinfection systems, the at least one fullerene derivative is an aminofullerene derivative, and the substrate surface is carboxylate-functionalized silica. In such embodiments, the present aminofullerene derivatives may be covalently bonded to the substrate surface via at least one amide bond originating on the silica surface. In some embodiments, each aminofullerene derivative is covalently bonded to the carboxylate-functionalized silica by one amide bond, leaving other amine groups of the aminofullerene unbonded. In other embodiments, each aminofullerene derivative is covalently bonded to the carboxylate-functionalized silica by more than one amide bond, leaving some or none of the other amine groups of the aminofullerene unbonded. One of ordinary skill in the art will recognize that various means for functionalizing silica surfaces are known in the art, and a number of different functionalized silica surfaces may be suitable for appending fullerene derivatives thereto, and the present examples utilizing aminofullerenes and carboxylate-functionalized silica should not be construed as limiting.

In some embodiments, the fullerene derivatives are covalently bonded to a single substrate surface. In other embodiments, the fullerene derivatives are covalently bonded to multiple substrate surfaces. For example, when the substrate surface is a continuous surface (e.g., a sheet), the fullerene derivative may be bonded to the substrate surface by one covalent bond or more than one covalent bond (e.g., amide bonds for aminofullerene derivatives). However, when the substrate surface is in a particulate form such as, for example, silica particles, the fullerene derivative maybe bonded to multiple particles such that the fullerene derivative bridges between individual particles. Alternately, however, the fullerene derivative may be covalently bound to only a single substrate surface, even when the substrate surface is in a particulate form. Covalent bonding of the present fullerene derivatives to substrate surfaces is advantageous in that it produces a more stable interface than can be obtained with photocatalysts that are not capable of being functionalized. Stated another way, covalent bonding allows a more robust photocatalyst-substrate surface interaction than is possible using conventional photocatalysts, thereby providing longer field lifetimes in the present photocatalytic disinfection systems.

When covalently bonded to a substrate surface, the at least one fullerene derivative may generate either more or less reactive oxygen species than the free fullerene derivative not covalently bonded to a substrate surface. In some embodiments, the at least one fullerene derivative generates more of the at least one reactive oxygen species when covalently bonded to the substrate surface than when the at least one fullerene derivative is not covalently bonded to the substrate surface. The ability to immobilize the present fullerene derivatives on a substrate surface while still maintaining the potential to generate significant quantities of reactive oxygen species is particularly advantageous for catalytic reuse in field applications such as, for example, environmental remediation. A concern with immobilization of fullerene derivatives on a substrate surface is that reduced photocatalytic activity and antimicrobial activity might result due to decreased surface area and possible photoquenching resulting from close contact between fullerene cages. Surprisingly, the fullerene derivatives of the present disclosure generally have an increased rate of reactive oxygen species generation when covalently bound to a substrate surface, leading to improved photocatalytic disinfection with the present systems. Although not required, the fullerene derivatives may optionally be covalently bound to the substrate surface through a long chain carbon spacer in order to move adjacent fullerene cages away from one another and the substrate surface and to increase the fullerene derivative's effective surface area in some embodiments. Attachment of the fullerene derivatives to a substrate surface via a long chain carbon spacer may allow further improvement in the ability of the fullerene derivatives to generate reactive oxygen species.

Without being bound by theory or mechanism, the increased rate of reactive oxygen species generation in the present fullerene derivatives may result from eliminating or substantially minimizing the aggregation of the fullerene derivatives, whether covalently bonded to a substrate surface or as the unbound free fullerene derivative. In the unbound state, some of the present fullerene derivatives tend to form large aggregates that are potentially susceptible to photoquenching. However, as demonstrated hereinafter, the present fullerene derivatives are able to generate reactive oxygen species even when present in an aggregated state. By covalently bonding the fullerene derivatives to a substrate surface, particle aggregation may be eliminated or substantially minimized, thereby further increasing the production rate of reactive oxygen species.

In some embodiments, a further advantage of covalently bonding the present fullerene derivatives to a substrate surface is that the substrate surface-bound fullerene derivatives may be efficiently sized. For example, in some embodiments, particle sizes of the substrate surface-bound fullerene derivatives may range from about 100 nm all the way up to about 1 mm. These particles can be conveniently sized into more narrow particle size distributions for use in fixed bed and fluidized bed reactors and filtration units, allowing continuous catalytic use of the surface-bound fullerene derivatives. Size selective separation of the particles may be accomplished using techniques familiar to those of ordinary skill in the art. Alternately, the substrate surface-bound fullerene derivatives may be used in any of the present embodiments without further sizing.

Reactive oxygen species produced by the present photocatalytic disinfection systems may mitigate a number of environmental contaminants. For example, in some embodiments, biological pathogens such as, for example, bacteria, viruses and protozoa may be inactivated by reactive oxygen species produced by irradiation of the present fullerene derivatives. In other embodiments, trace organic contaminants such as, for example, pharmaceutical and petrochemical contaminants may be reacted with the reactive oxygen species to degrade the organic contaminants completely or partially into a more easily processed form. For example, highly hydrophobic organic compounds may be reacted with reactive oxygen species to render the compounds more hydrophilic for removal using other chemical or physical separation processes. In addition to the foregoing contaminants, organic pollutants such as, for example, endocrine disruptors, pesticide residues and algal toxins may be effectively remediated by the present photocatalytic disinfection systems.

The use of the solar spectrum as a light source in some embodiments the present photocatalytic disinfection systems is particularly advantageous in that it enables field deployment of the photocatalytic disinfection systems in areas where conventional photocatalysts is not feasible. Specifically, since the solar spectrum may be used to affect purification, the present photocatalytic disinfection systems do not require an external power source in some embodiments. Therefore, the photocatalytic disinfection systems may be deployed where an external power source is not readily available or economically feasible such as, for example, rural areas and developing countries.

Another significant advantage of the present photocatalytic disinfection systems is that toxic or carcinogenic byproducts are not produced, making the photocatalytic disinfection systems suitable for purifying water meant for human consumption. In contrast, in conventional chlorination and ozonation processes for purifying water, byproducts having known health effects may be produced (e.g., trihalomethanes and bromate).

In other various embodiments, methods for using the present fullerene derivatives in photochemical purification processes are also described herein. In some embodiments the methods include providing a composition containing at least one fullerene derivative that is operable for forming at least one reactive oxygen species in the presence of a light source, exposing the composition to a material containing at least one contaminant, and irradiating the composition with a light source to generate at least one reactive oxygen species, which reacts with the at least one contaminant. In some embodiments of the methods, the compositions further include a substrate surface that is covalently bonded to the at least one fullerene derivative.

In some embodiments of the methods, the light source is a visible light source. In other various embodiments of the methods, the light source is an ultraviolet light source. In some embodiments, the light source is the solar spectrum. In some embodiments of the methods, the reactive oxygen species is singlet oxygen.

In some embodiments of the methods, the at least one fullerene derivative is a $C_{60}$ derivative. In some embodiments of the methods, the at least one fullerene derivative is a hexakis-substituted $C_{60}$ derivative. In some embodiments, the hexakis-substituted $C_{60}$ derivative may be, for example,

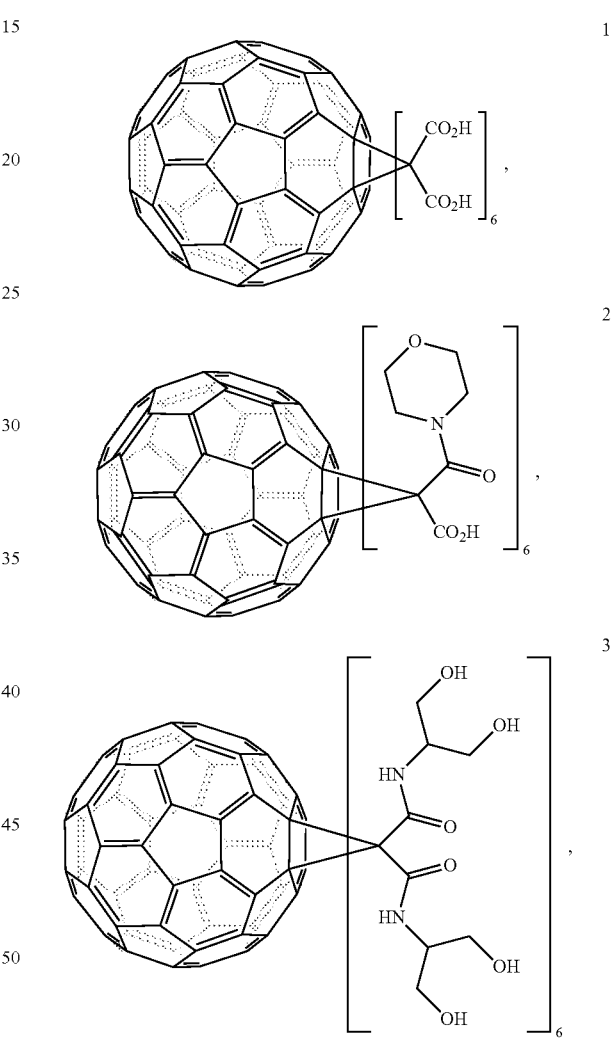

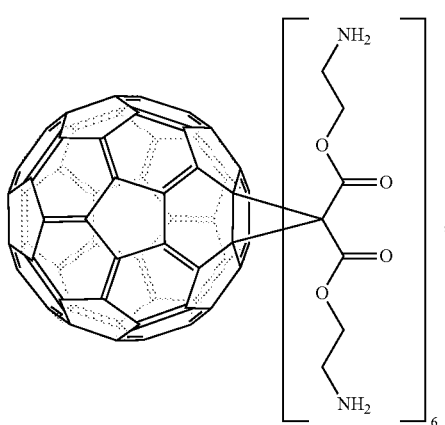

combinations thereof, and salts thereof (e.g., chloride or trifluoroacetate).

In some embodiments of the methods, the at least one fullerene derivative is at least one aminofullerene containing $C_{60}$ and a plurality of amine-terminated moieties covalently bonded to the $C_{60}$ (e.g., hexakis-substituted $C_{60}$ derivative 4). In some embodiments of the methods, the composition further includes a substrate surface covalently bonded to the at least one aminofullerene. In more general embodiments, aminofullerenes for use in the present methods have the following structure:

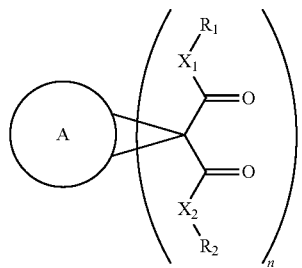

where the variables are defined as previously set forth hereinabove.

In some embodiments, the present methods may be used to remove at least one contaminant from a liquid source such as, for example, water or wastewater (e.g., industrial runoff). In other embodiments, the present methods may be used to remove at least one contaminant from a gas such as, for example, air or inert gases. In general, the present compositions and methods may be used in a purification of either a liquid phase or a gas phase. Gas phase purification may be particularly efficacious, since the lifetime of singlet oxygen is greater in air than in water.

In some embodiments of the present methods, the at least one contaminant is a bacterium (e.g., *E. coli*) or a virus (e.g., MS-2 bacteriophage). In other embodiments of the present methods, the at least one contaminant is a chemical pollutant such as, for example, organic small molecules. In some embodiments, the at least one contaminant is a pharmaceutical compound (e.g., ranitidine, cimetidine, propanolol, or sulfisoxazole). In some embodiments, the at least one contaminant is a petrochemical compound.

In some embodiments, methods of the present disclosure include providing a composition containing at least one aminofullerene covalently bonded to a substrate surface, exposing the composition to a material containing at least one contaminant, and irradiating the composition with a light source to generate at least one reactive oxygen species that reacts with the at least one contaminant. The at least one aminofullerene is operable for forming at least one reactive oxygen species in the presence of a light source. In more general embodiments of the methods, the at least one aminofullerene has the following structure:

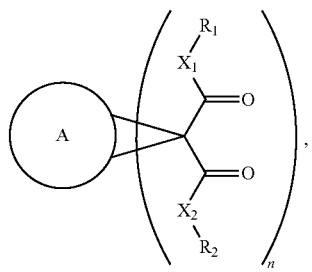

where the variables are defined as previously set forth hereinabove.

In some embodiments, the at least one aminofullerene is a mixture of $C_{60}$ aminofullerenes. In some embodiments, the at least one aminofullerene is a mixture of mono-substituted, di-substituted, tri-substituted, tetrakis-substituted, pentakis-substituted and hexakis-substituted $C_{60}$ aminofullerenes. In other embodiments of the methods, the at least one aminofullerene is a hexakis-substituted $C_{60}$ derivative.

In some embodiments of the methods, the light source is a visible light source. In other embodiments of the methods, the light source is an ultraviolet light source. In some embodiments of the methods, the light source is the solar spectrum. In some embodiments, the at least one reactive oxygen species is singlet oxygen.

In some embodiments, the present methods may be used to remove at least one contaminant from a liquid source such as, for example, water or wastewater. In other embodiments, the present methods may be used to remove at least one contaminant from a gas such as, for example, air or inert gases. In some embodiments of the present methods, the at least one contaminant is a bacterium (e.g., *E. coli*) or a virus (e.g., MS-2 bacteriophage). In other embodiments of the present methods, the at least one contaminant is a chemical pollutant such as, for example, organic small molecules. In some embodiments, the at least one contaminant is a pharmaceutical compound (e.g., ranitidine, cimetidine, propanolol or sulfisoxazole). In other embodiments, the at least one contaminant is a petrochemical compound.

In some embodiments, methods of the present disclosure include providing a composition containing at least one aminofullerene covalently bonded to a substrate surface, exposing the composition to a material containing at least one contaminant, and irradiating the composition with a visible light source to generate at least one reactive oxygen species. The at least one aminofullerene contains $C_{60}$ and a plurality of amine-terminated moieties covalently bonded to the $C_{60}$. The at least one aminofullerene is operable for forming at least one reactive oxygen species in the presence of a visible light source.

In some embodiments, the at least one reactive oxygen species is at least singlet oxygen, and the at least one contaminant may be, for example, a bacterium, a virus, a protozoan or combinations thereof. In such embodiments, the singlet oxygen inactivates the at least one contaminant.

In other embodiments, the at least one reactive oxygen species is at least singlet oxygen and the at least one contaminant is a chemical pollutant. In such embodiments, the singlet oxygen degrades the at least one contaminant. As referenced hereinabove, in some embodiments, the degradation may be complete. However, in other embodiments, the degradation may involve a chemical transformation that renders the at least one contaminant removable by other purification methods.

EXPERIMENTAL EXAMPLES

The following examples are provided to more fully illustrate some of the embodiments disclosed hereinabove. It should be appreciated by those of ordinary skill in the art that the methods disclosed in the examples that follow represent techniques that constitute illustrative modes for practice of the disclosure. Those of ordinary skill in the art should, in light of the present disclosure, appreciate that many changes can be made in the specific embodiments that are disclosed and still obtain a like or similar result without departing from the spirit and scope of the disclosure.

Example 1

Synthesis and Purification of Hexakis-Substituted $C_{60}$ Fullerene Derivatives. FIGS. 2A-2D show illustrative synthetic routes used for synthesizing hexakis-substituted $C_{60}$ fullerene derivatives. In general, nucleophilic addition of malonate ester or malonate amide derivatives to $C_{60}$ was accomplished using the Bingel reaction. Generally, $C_{60}$ 9 and a malonate ester or malonate amide derivative were dissolved in toluene in the presence of a base [e.g., 1,8-diazabicyclo[5.4.0]undec-7-ene (DBU) or a phosphazene base]. The hexakis-substituted adduct was then isolated from the reaction mixture via liquid chromatography to produce hydrolyzable intermediates 10-13. Following hydrolysis, hexakis-substituted $C_{60}$ derivatives 1-4 were isolated, purified by dialysis and dried under vacuum.

Figure 2A:
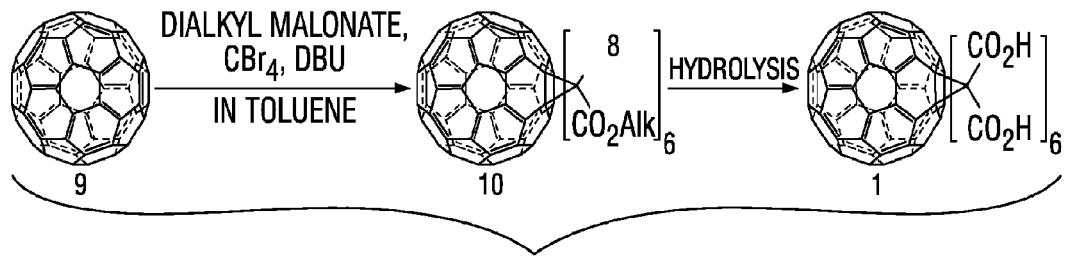
FIGS. 2A-2D show illustrative synthetic routes used for synthesizing hexakis-substituted $C_{60}$ fullerene derivatives 1-4.
Figure 2B:
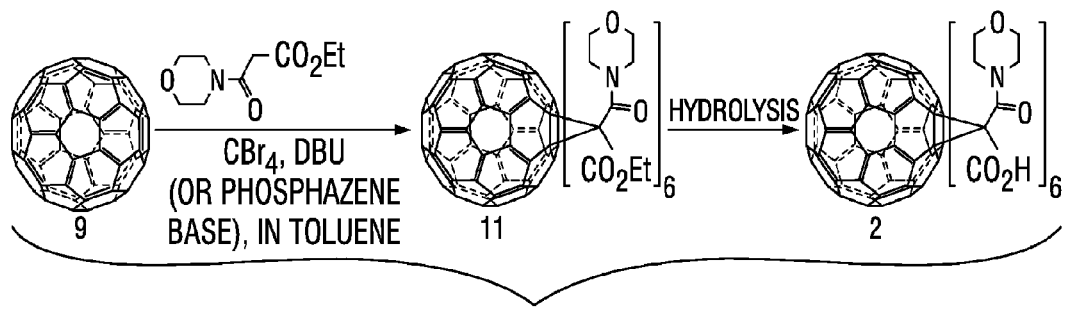
Figure 2C:
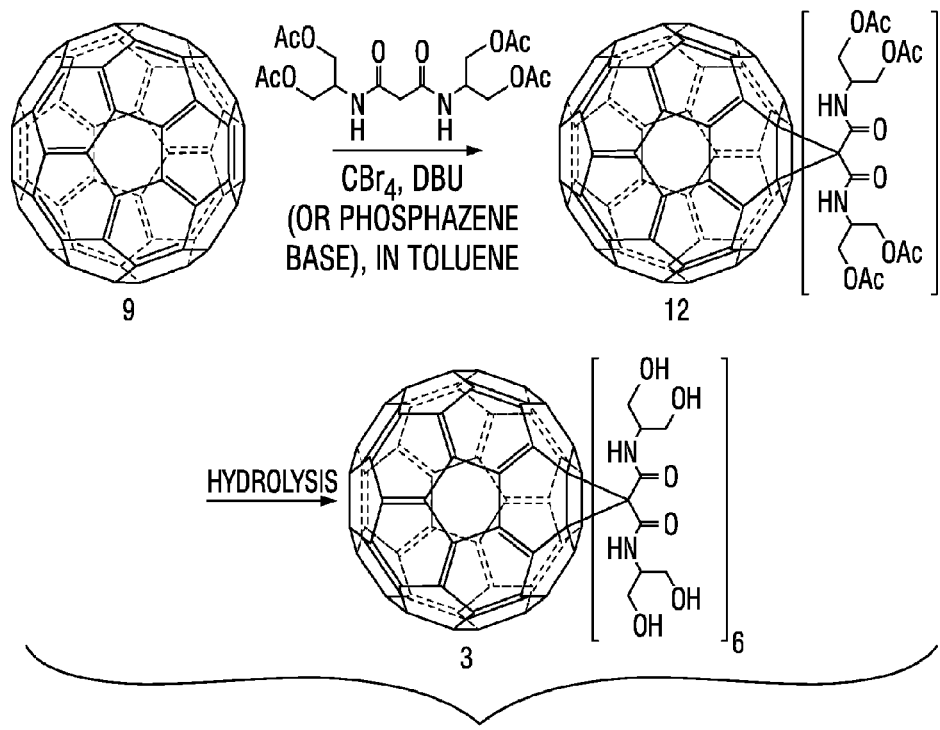
Figure 2D:
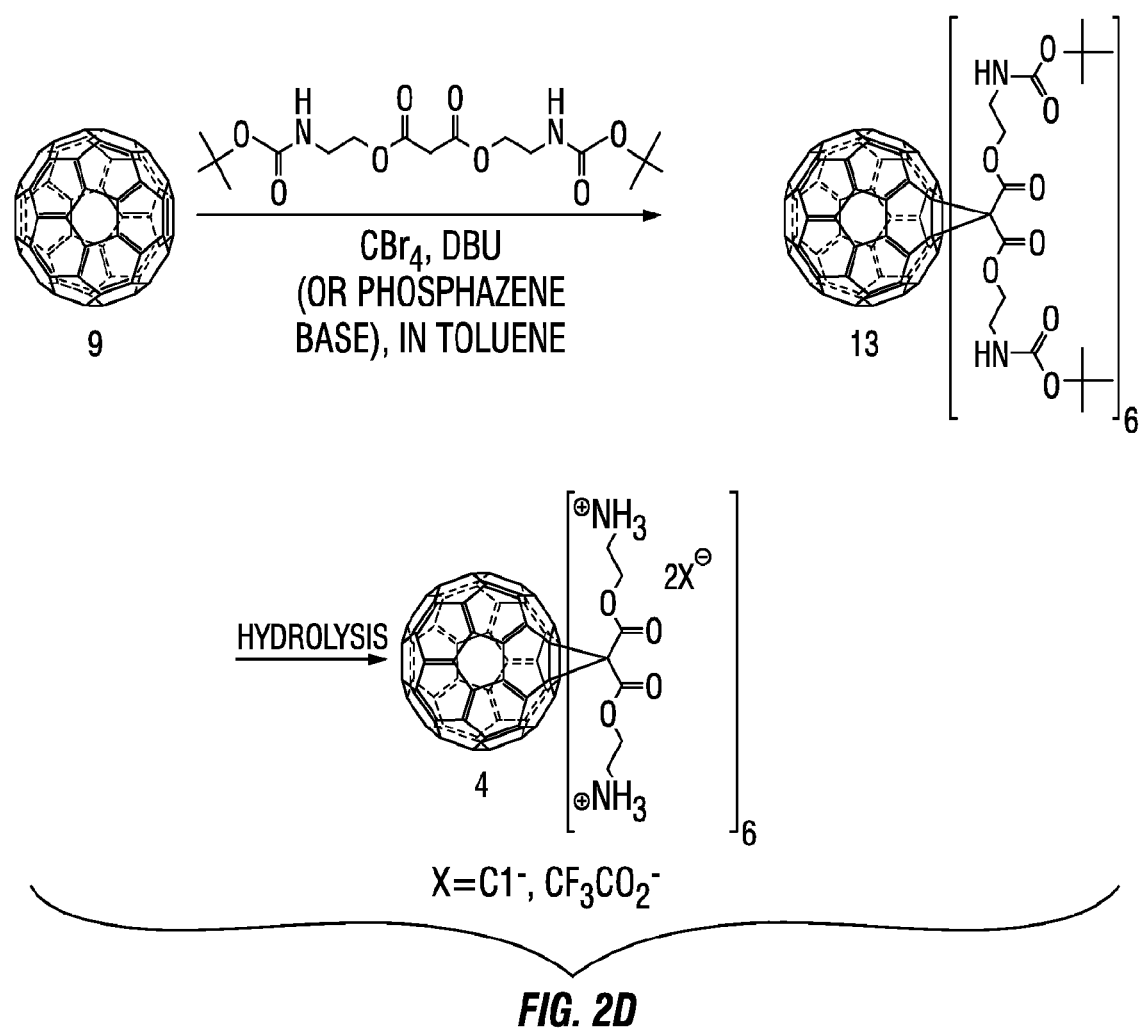
Figure 2E:
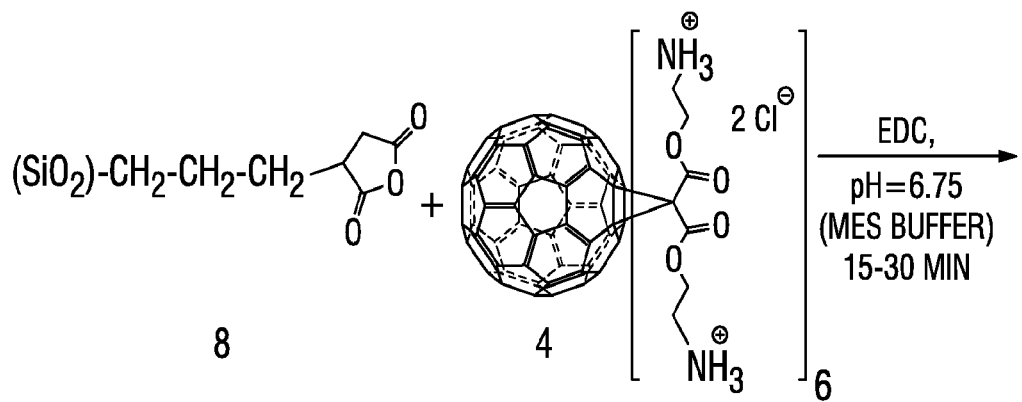
FIG. 2E shows an illustrative synthetic route used for appending hexakis-substituted $C_{60}$ fullerene derivative 4 to a silica surface.
Figure 2E:
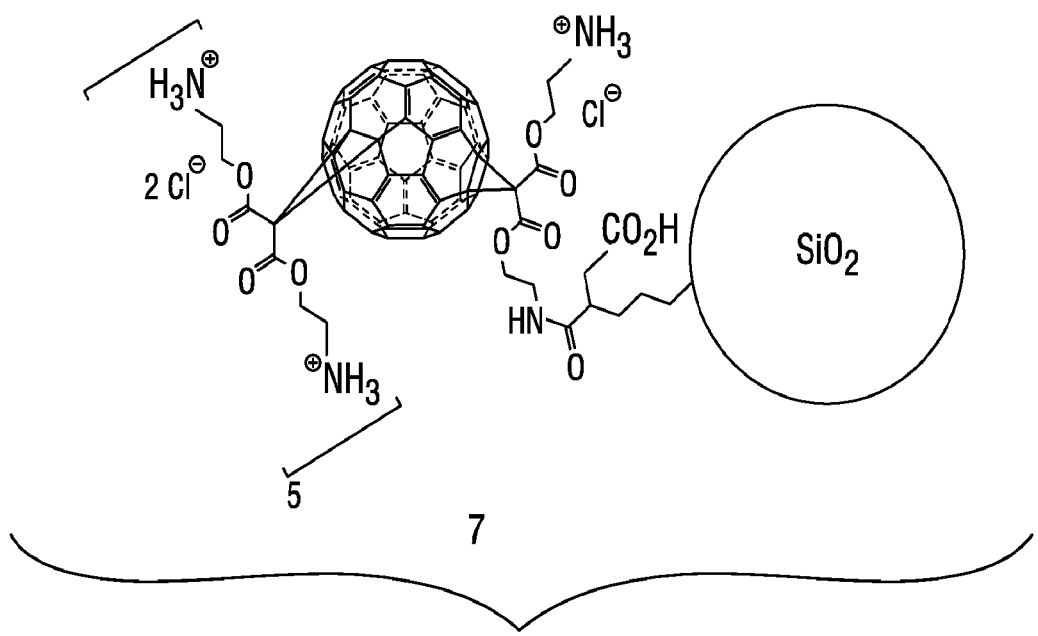

Hexakis-substituted $C_{60}$ fullerene derivative 4, an aminofullerene, was further reacted with functionalized silica gel 8 using 1-(3-dimethylaminopropyl)-3-ethylcarbodiimide hydrochloride (EDC) to form amide bonds to the silica surface in fullerene-functionalized silica surface 7. FIG. 2E shows an illustrative synthetic route used for appending hexakis-substituted $C_{60}$ fullerene derivative 4 to a silica surface. Fullerene content on the silica surface was determined by thermogravimetric analysis, and formation of the amide bonds was confirmed by infrared spectroscopy.

Example 2

Figure 3:
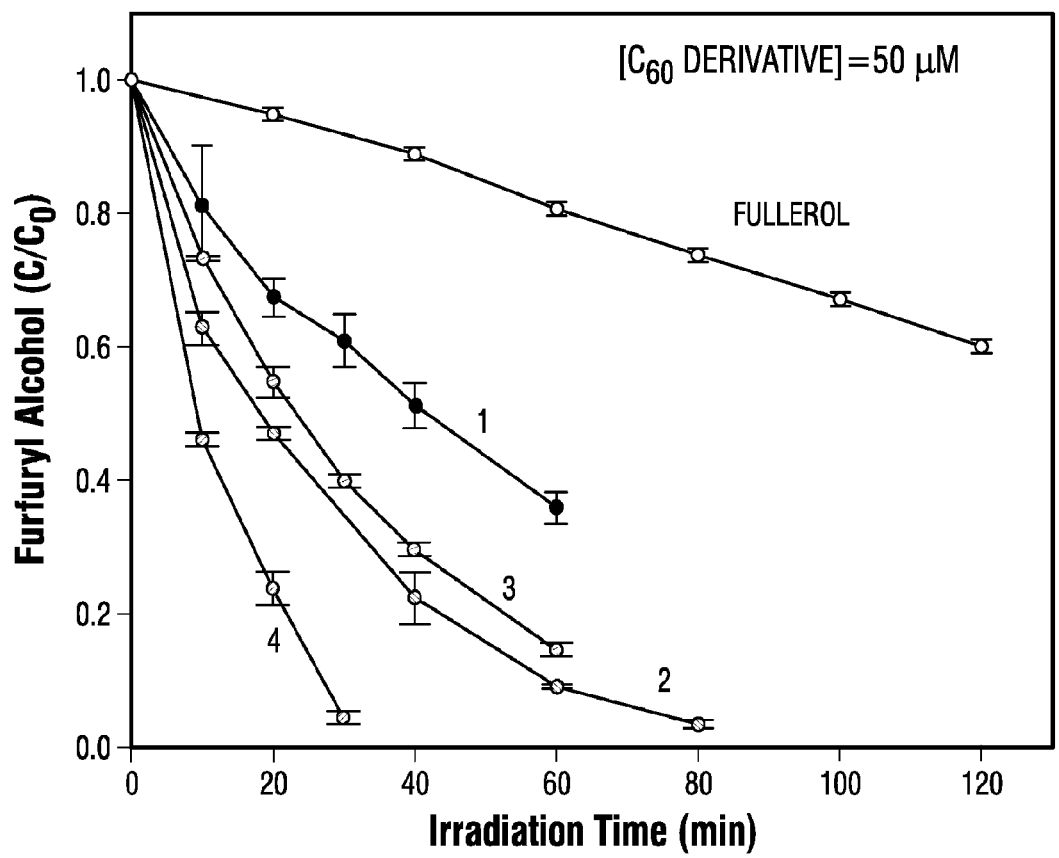
FIG. 3 shows illustrative plots of fractional furfuryl alcohol remaining in the presence of various hexakis-substituted $C_{60}$ fullerene derivatives and fullerol as a function of irradiation time.

Photochemically-Induced Singlet Oxygen Production from Hexakis-Substituted $C_{60}$ Fullerene Derivatives. Photochemical generation of singlet oxygen was performed using a magnetically stirred 60 mL cylindrical quartz reactor surrounded by six 4 W black light blue (BLB) lamps (emission wavelength region: 350-400 nm, Philips TL4W) at ambient temperature (22° C.). The incident light intensity was $3.79 \times 10^{-4}$ Einstein·min$^{-1}$L$^{-1}$. Reaction solutions containing 50 µM of hexakis-substituted $C_{60}$ fullerene derivatives 1-4 and 0.5 mM furfuryl alcohol (FFA) as an indicator/reactant for singlet oxygen formed were buffered at pH=7 using 10 mM phosphate buffer. Thereafter, the solutions were exposed to the light source. As the photochemical reaction proceeded, 1 mL sample aliquots were periodically withdrawn from the reactor using a syringe, filtered through a 0.22 µm PTFE filter (Millipore), and injected into a 2 mL amber glass vial for further analysis. The residual FFA concentration was quantified using HPLC. FIG. 3 shows illustrative plots of fractional furfuryl alcohol remaining in the presence of various hexakis-substituted $C_{60}$ fullerene derivatives and fullerol as a function of irradiation time. Generation of singlet oxygen from commercially-available fullerol is presented for comparison purposes.

Table 1 summarizes the initial degradation rate of FFA in the presence of hexakis-substituted $C_{60}$ fullerene derivatives 1-4 in comparison to commercially available fullerol and Rose Bengal. Initial FFA degradation rates of hexakis-substituted $C_{60}$ fullerene derivatives 1-4 in the presence of L-histidine and t-butanol are also presented for comparison. Excess L-histidine significantly inhibited the degradation rate of FFA, whereas the degradation rate was not significantly altered in the presence of t-butanol. Both of these results are indicative of singlet oxygen being the predominant reactive oxygen species formed under photochemical irradiation. As shown by the FFA degradation rate, the singlet oxygen production of the $C_{60}$ fullerene derivatives was greatest for hexakis-substituted $C_{60}$ fullerene derivative 4 and smallest for hexakis-substituted $C_{60}$ fullerene derivative 1. All of the hexakis-substituted $C_{60}$ fullerene derivatives displayed greater singlet oxygen production rates than commercially available fullerol.

TABLE 1

Singlet Oxygen Production Rates of Hexakis-Substituted $C_{60}$ Derivatives

| | Initial FFA Degradation Rate | | |
| --- | --- | --- | --- |
| | No Scavenger | L-Histidine Scavenger | t-Butanol Scavenger |
| 1 | 8.18 ± 0.68 | 0.15 ± 0.04 | 6.30 ± 0.44 |
| 2 | 13.28 ± 0.44 | 0.68 ± 0.10 | 11.68 ± 0.26 |
| 3 | 11.36 ± 0.56 | 0.72 ± 0.10 | 10.43 ± 0.92 |
| 4 | 19.06 ± 0.60 | 0.28 ± 0.13 | 18.21 ± 0.39 |
| Fullerol | 1.30 ± 0.19 | 0.25 ± 0.05 | 1.52 ± 0.14 |
| Rose Bengal | 16.34 ± 0.29 | 0.07 ± 0.04 | 16.70 ± 0.47 |

Figure 4:
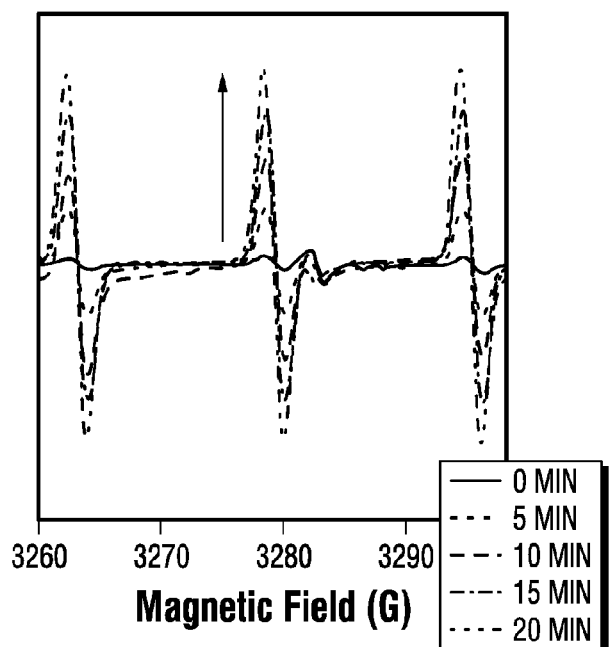
FIG. 4 shows illustrative electron paramagnetic resonance (EPR) spectra of hexakis-substituted $C_{60}$ fullerene derivative 4 as a function of irradiation time in the presence of 2,2,6,6-tetramethyl-4-piperidinol as a spin-trapping reagent.

FIG. 4 shows illustrative electron paramagnetic resonance (EPR) spectra of hexakis-substituted $C_{60}$ fullerene derivative 4 as a function of irradiation time in the presence of 2,2,6,6-tetramethyl-4-piperidinol as a spin-trapping reagent. The increased EPR signal as a function of irradiation time is consistent with increased single oxygen production at longer irradiation times.

Example 3

Measurement of Triplet-State Decay Kinetics in Hexakis-Substituted $C_{60}$ Fullerene Derivatives. Decay kinetics of the triplet states for the hexakis-substituted $C_{60}$ derivatives were measured by laser flash photolysis using a 308 nm laser pulse (10-20 mJ with a pulse width of 10 ns). A xenon lamp was used as the monitoring source. For the laser flash photolysis measurements, the hexakis-substituted $C_{60}$ fullerene derivatives were buffered at pH=7 in 10 mM phosphate buffer, and the concentration was adjusted to produce an absorbance of ~0.5 absorbance units at 308 nm. The test solutions were purged with bubbling argon gas for 15 minutes and then sealed from the atmosphere. Instantaneous generation of the triplet state was induced by laser pulse irradiation with subsequent monitoring between 650 and 770 nm, depending on the specific functional groups present in each hexakis-substituted $C_{60}$ fullerene derivative.

Figure 5:
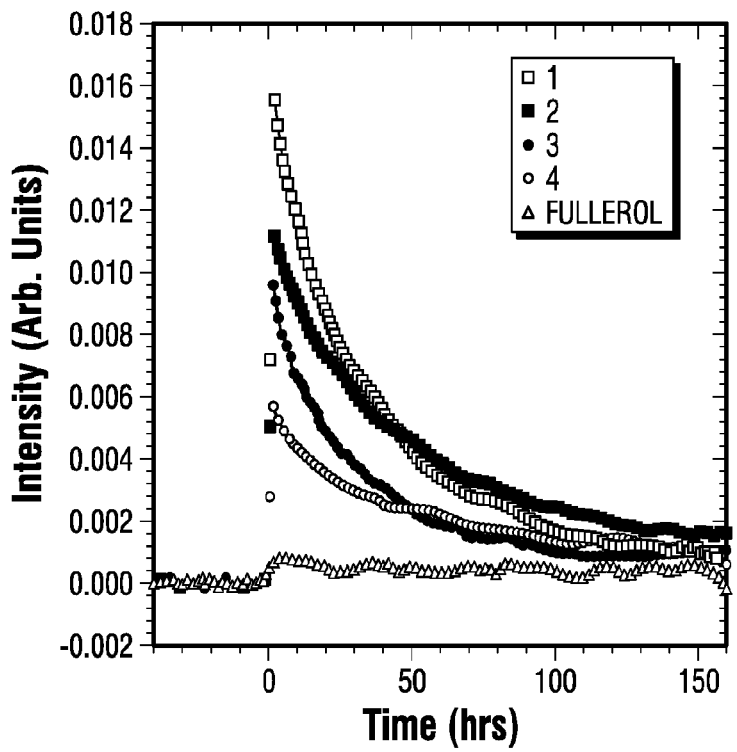
FIG. 5 shows illustrative plots of triplet state decay kinetics in various hexakis-substituted $C_{60}$ fullerene derivatives in comparison to fullerol.

FIG. 5 shows illustrative plots of triplet state decay kinetics in various hexakis-substituted $C_{60}$ fullerene derivatives in comparison to fullerol. As shown in FIG. 5, all of the hexakis-substituted $C_{60}$ fullerene derivatives displayed superior triplet-state decay kinetics compared to commercially-available fullerol. The triplet state lifetimes for hexakis-substituted $C_{60}$ fullerene derivatives 1-4 ranged from 30 to 44 μs, whereas the triplet state lifetime for the fullerol was only ~9 μs. Under comparable experimental conditions, triplet state formation was not detected in a hexane solution of pristine $C_{60}$ due to photoquenching resulting from contact between neighboring $C_{60}$ cages.

Example 4

Figures 6A, 6B:
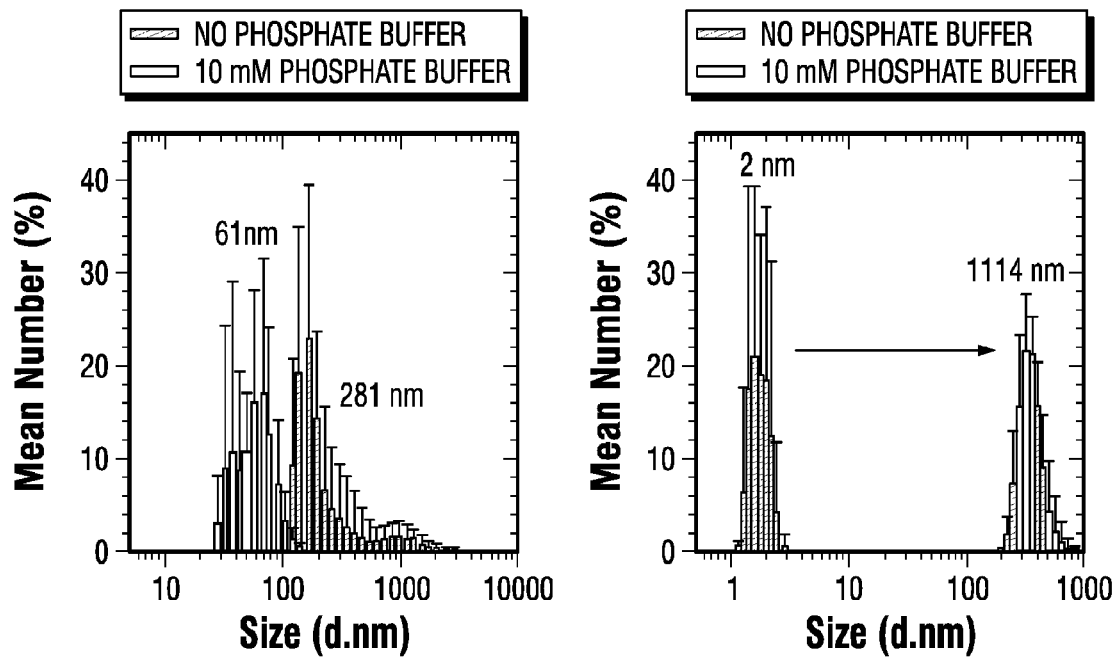
FIGS. 6A and 6B show illustrative particle size histograms for various hexakis-substituted $C_{60}$ fullerene derivatives deposited from a water solution and a 10 mM phosphate buffer solution.

Particle Size Measurements in Hexakis-Substituted $C_{60}$ Fullerene Derivatives. Water or phosphate buffer solutions of the hexakis-substituted $C_{60}$ fullerene derivatives were dried on a carbon grid and analyzed by dynamic light scattering using a Zetasizer Nano ZS90 particle size analyzer having a detection size limit of ~1 nm. FIGS. 6A and 6B show illustrative particle size histograms for various hexakis-substituted $C_{60}$ fullerene derivatives deposited from a water solution and a 10 mM phosphate buffer solution. FIG. 6A shows the particle size histogram for hexakis-substituted $C_{60}$ fullerene derivative 2. FIG. 6B shows the particle size histogram for hexakis-substituted $C_{60}$ fullerene derivative 4. As shown in FIGS. 6A and 6B, dramatically different particle size distributions were observed for the hexakis-substituted $C_{60}$ fullerene derivatives depending on the aqueous solution chemistry. It is notable that in spite of the fairly large particle agglomerates formed in aqueous solutions, production of singlet oxygen still remained facile in the hexakis-substituted $C_{60}$ fullerene derivatives. This behavior is in marked contrast to $C_{60}$, where particle aggregation causes a dramatic drop in its ability to photochemically generate singlet oxygen.

Example 5

Bacterial and Viral Inactivation of Hexakis-Substituted $C_{60}$ Fullerene Derivatives. Intrinsic antibacterial properties of several hexakis-substituted $C_{60}$ fullerene derivatives and fullerol were evaluated in the dark using a minimum inhibitory concentration (MIC) assay with *Escherichia coli* K12. *E. coil* was cultured in Luria-Bertani broth and incubated at 37° C. overnight prior to transferring to Minimal Davis (MD) media (i.e., Davis media with potassium phosphate reduced by 90%). The cultures were diluted to a final optical density of 0.002 at 600 nm (OD600). The hexakis-substituted $C_{60}$ fullerene derivatives were then added to the MD media at various concentrations. Overnight growth at 37° C. was assessed spectrophotometrically by measuring OD600. The minimal concentration of functionalized $C_{60}$ fullerene derivatives resulting in no turbidity (indicating no growth of *E. coli*) was denoted as the MIC. Hexakis-substituted $C_{60}$ fullerene derivatives 1 and 3 did not inhibit *E. coli* growth in the dark (MIC>400 mM). Hexakis-substituted $C_{60}$ fullerene derivative 4 displayed a mild intrinsic antibacterial activity of 120 μM against *E. coli*. However, compared to pristine $C_{60}$, the intrinsic antimicrobial activity was relatively mild, as $C_{60}$ displayed MIC values ranging from 0.7 to 2.8 μM.

Photoinduced bactericidal and virucidal activities of the hexakis-substituted $C_{60}$ fullerene derivatives were assessed using *E. coli* and MS-2 bacteriophage. *E. coil* was cultured in tryptic soy broth media for 18 h at 37° C. The *E. coil* stock solution was prepared by resuspending the centrifuged harvest in 10 mM phosphate buffer after washing twice. The final concentration was determined by a spread plate method on nutrient agar after 24 h culture at 37° C. The MS-2 bacteriophage was obtained by inoculating *E. coli* C3000 grown in the exponential to early stationary phase with MS-2 bacteriophage, and quantified by a soft agar overlay (double-agar layer) plaque assay method. MS-2 bacteriophage stock was prepared from overlay agar plates of confluent lysis. Photosensitized microbial inactivation was performed using a BLB lamp with a light intensity low enough to ensure that UV irradiation alone did not induce any *E. coli* or MS-2 bacteriophage inactivation ($8.4 \times 10^{-6}$ Einstein min$^{-1}$L-1 for *E. coli*; $6.1 \times 10^{-6}$ Einstein min$^{-1}$ L$^{-1}$ for MS-2 bacteriophage). The reaction solutions (10 mM phosphate buffer at pH 7.0) for *E. coli* and MS-2 bacteriophage inactivation experiments consisted of 50 μM hexakis-substituted $C_{60}$ fullerene derivative and either *E. coli* at $3 \times 10^5$ colony forming units (CFU)/mL or MS-2 bacteriophage at $3 \times 10^5$ plaque forming units (PFU)/mL, respectively. During each experiment, a 1 mL sample was withdrawn at fixed time intervals for quantification of *E. coli* and MS-2 bacteriophage. Three replicates analyses were performed (standard deviation <10%).

Figure 7:
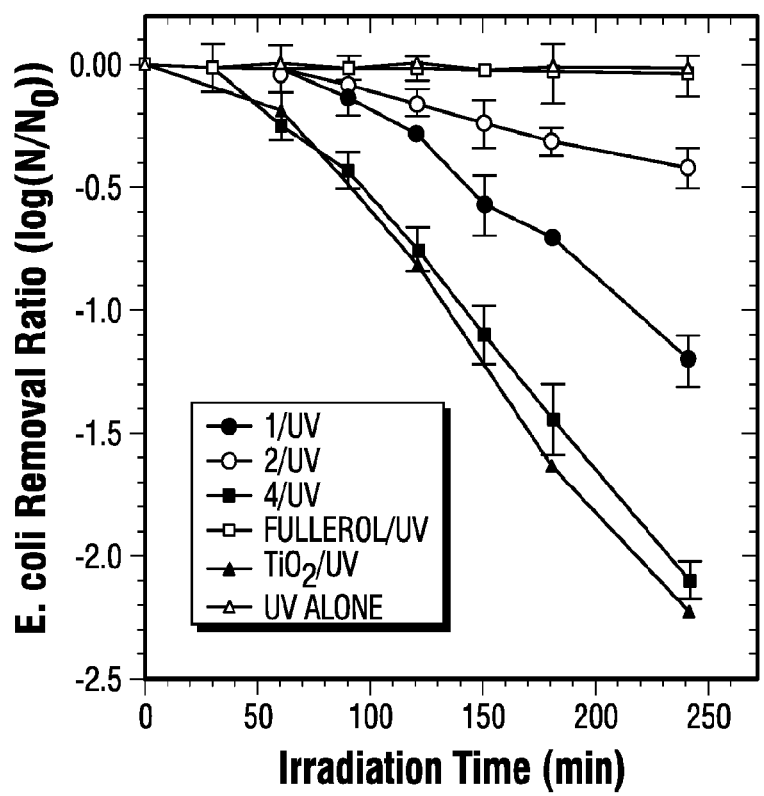
FIG. 7 shows illustrative plots of E. coli inactivation as a function of irradiation time by various hexakis-substituted $C_{60}$ fullerene derivatives in comparison to fullerol and $TiO_2$.
Figure 8:
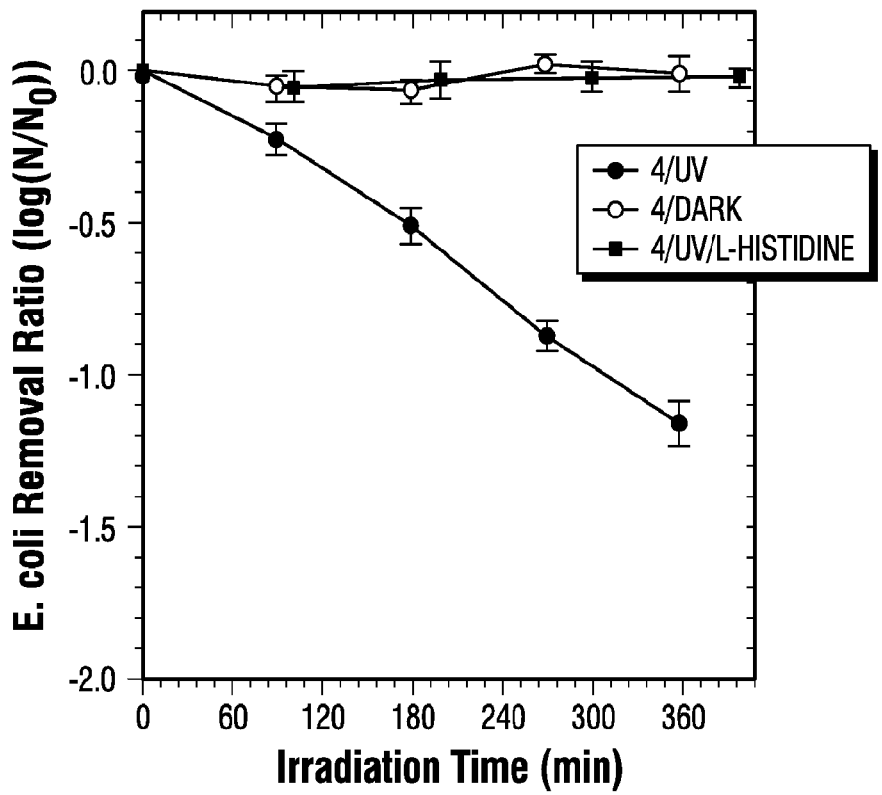
FIG. 8 shows illustrative plots of E. coli inactivation as a function of irradiation time by hexakis-substituted $C_{60}$ fullerene derivative 4 in UV light both in the presence and absence of L-histidine scavenger and in the dark.

FIG. 7 shows illustrative plots of *E. coli* inactivation as a function of irradiation time by various hexakis-substituted $C_{60}$ fullerene derivatives in comparison to fullerol and $TiO_2$ in the presence of BLB light. For each of hexakis-substituted $C_{60}$ fullerene derivatives 1, 2 and 4, significant *E. coli* inactivation was observed after a lag period that is commonly seen in bacterial disinfection kinetics. Under the tested conditions, no *E. coli* was inactivated by the fullerol or the UV light alone. Inactivation by hexakis-substituted $C_{60}$ fullerene derivative 4 was comparable to that produced by $TiO_2$, which is a commonly used material for photochemically induced bacterial inactivation. FIG. 8 shows illustrative plots of *E. coil* inactivation as a function of irradiation time by hexakis-substituted $C_{60}$ fullerene derivative 4 in UV light both in the presence and absence of L-histidine scavenger and in the dark. As shown in FIG. 8, no bacterial inactivation was observed either in the dark or in the presence of the scavenger.

Figure 9:
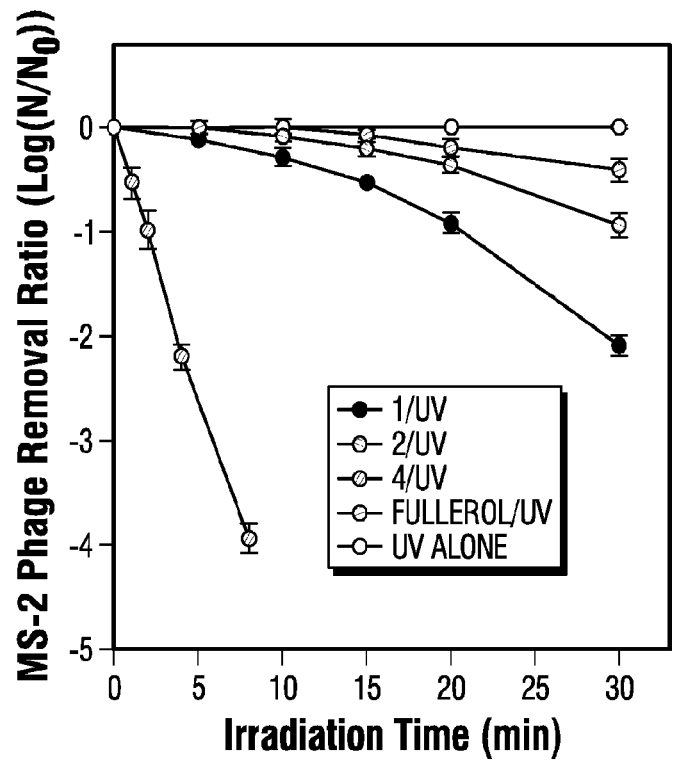
FIG. 9 shows illustrative plots of MS-2 bacteriophage inactivation as a function of irradiation time by various hexakis-substituted $C_{60}$ fullerene derivatives in comparison to fullerol.

FIG. 9 shows illustrative plots of MS-2 bacteriophage inactivation as a function of irradiation time by various hexakis-substituted $C_{60}$ fullerene derivatives in comparison to fullerol in the presence of BLB light. For each of hexakis-substituted $C_{60}$ fullerene derivatives 1, 2 and 4, significant MS-2 bacteriophage inactivation was observed, particularly for hexakis-substituted $C_{60}$ fullerene derivative 4. Under the tested conditions, fullerol produced very little MS-2 bacteriophage inactivation. The inactivation of the MS-2 bacteriophage virus is particularly significant, since viral inactivation is typically much more difficult to conduct under UV irradiation than is bacterial inactivation.

Figure 10:
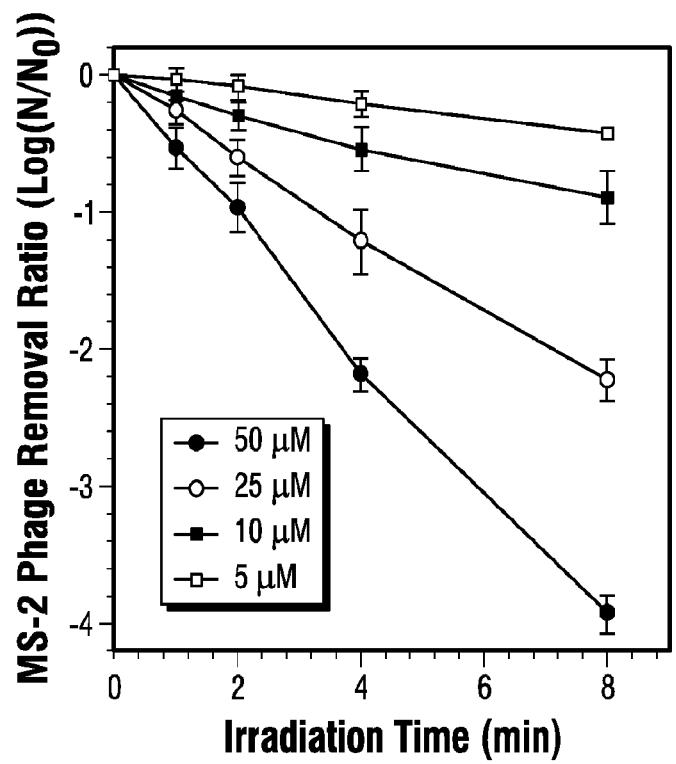
FIG. 10 shows illustrative plots of MS-2 bacteriophage inactivation as a function of irradiation time by various concentrations of hexakis-substituted $C_{60}$ fullerene derivative 4.
Figure 11:
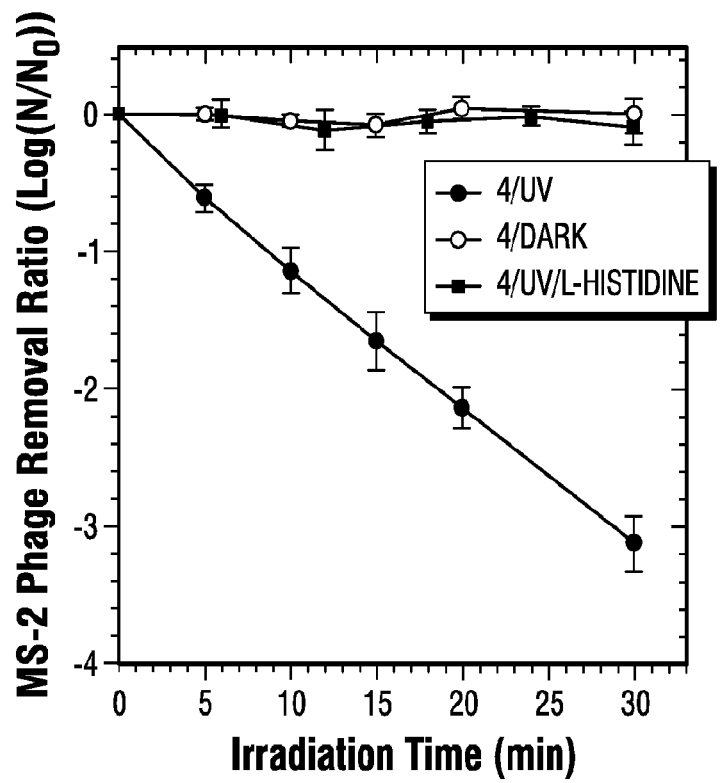
FIG. 11 shows illustrative plots of MS-2 bacteriophage inactivation as a function of irradiation time by hexakis-substituted $C_{60}$ fullerene derivative 4 at 10 µM in UV light both in the presence and absence of L-histidine scavenger and in the dark.

FIG. 10 shows illustrative plots of MS-2 bacteriophage inactivation as a function of irradiation time by various concentrations of hexakis-substituted $C_{60}$ fullerene derivative 4. FIG. 11 shows illustrative plots of MS-2 bacteriophage inactivation as a function of irradiation time by hexakis-substituted $C_{60}$ fullerene derivative 4 at 10 μM in UV light both in the presence and absence of L-histidine scavenger and in the dark. At low concentrations of hexakis-substituted $C_{60}$ fullerene derivative 4 (~10 μM) there was no inactivation of MS-2 bacteriophage in the dark or in the presence of an L-histidine scavenger. However, unlike the behavior observed in the inactivation of *E. coil*, at higher concentrations (~50 μM), some MS-2 bacteriophage inactivation occurred even in the dark or in the presence of L-histidine.

Figure 12:
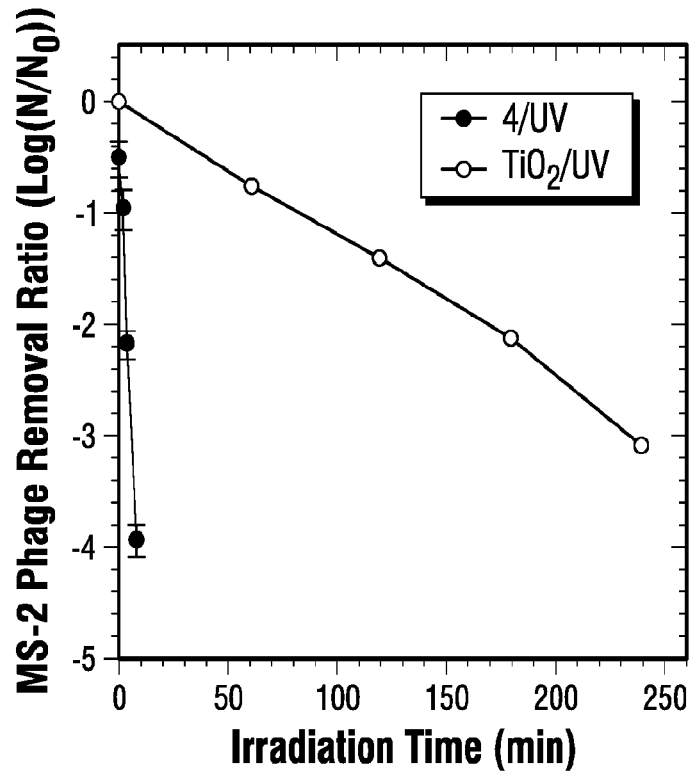
FIG. 12 shows illustrative plots of MS-2 bacteriophage inactivation as a function of irradiation time by hexakis-substituted $C_{60}$ fullerene derivative 4 in comparison to $TiO_2$.

FIG. 12 shows illustrative plots of MS-2 bacteriophage inactivation as a function of irradiation time by hexakis-substituted $C_{60}$ fullerene derivative 4 in comparison to $TiO_2$. As shown in FIG. 12, hexakis-substituted $C_{60}$ fullerene derivative 4 significantly outperformed $TiO_2$ in its viral inactivation capabilities. Under identical conditions, a concentration of 0.15 g/L of hexakis-substituted $C_{60}$ fullerene derivative 4 led to a 2-log reduction of active MS-2 bacteriophage in only 4 minutes, whereas a comparable inactivation with 0.2 g/L of $TiO_2$ took over 3 hours to achieve.

Example 6

Figure 13:
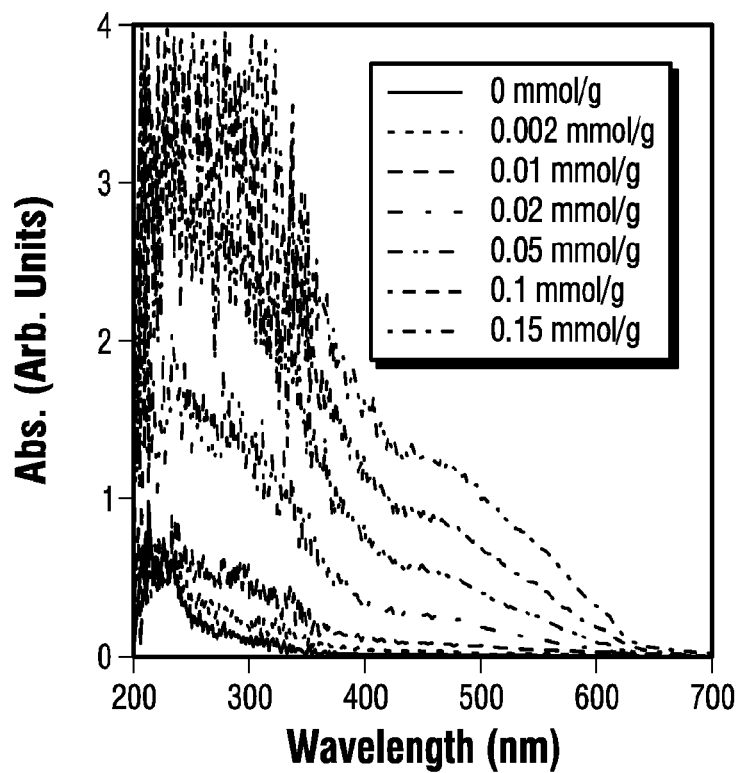
FIG. 13 shows illustrative UV-VIS reflectance spectra of various concentrations of hexakis-substituted $C_{60}$ fullerene derivative 4 covalently bound to a functionalized silica gel support.

Photophysical Properties and Photochemical Degradation by Silica-Bound Hexakis-Substituted $C_{60}$ Fullerene Derivative 4. Hexakis-substituted $C_{60}$ fullerene derivative 4 was covalently bound via amide bond(s) to 3-(2-succinic anhydride)propyl functionalized silica gel (~0.2-0.3 mm diameter), which is commercially available. Other types of functionalized silica gels may be used equivalently or in a very similar manner. FIG. 13 shows illustrative UV-VIS reflectance spectra of various concentrations of hexakis-substituted $C_{60}$ fullerene derivative 4 covalently bound to a functionalized silica gel support. The UV-VIS spectra of the surface-bound hexakis-substituted $C_{60}$ fullerene derivative 4 was comparable to that of the unbound derivative.

Figure 14:
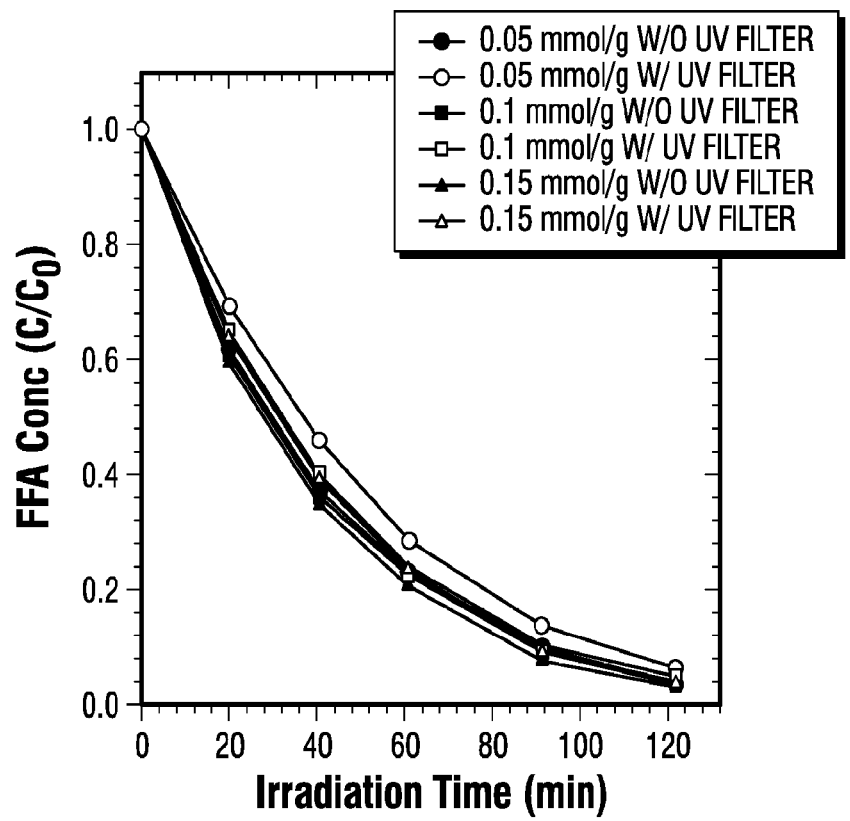
FIG. 14 shows illustrative plots of fractional FFA remaining as a function of irradiation time for various concentrations of silica-bound hexakis-substituted $C_{60}$ fullerene derivative 4 in the presence and absence of a UV cutoff filter.
Figure 15:
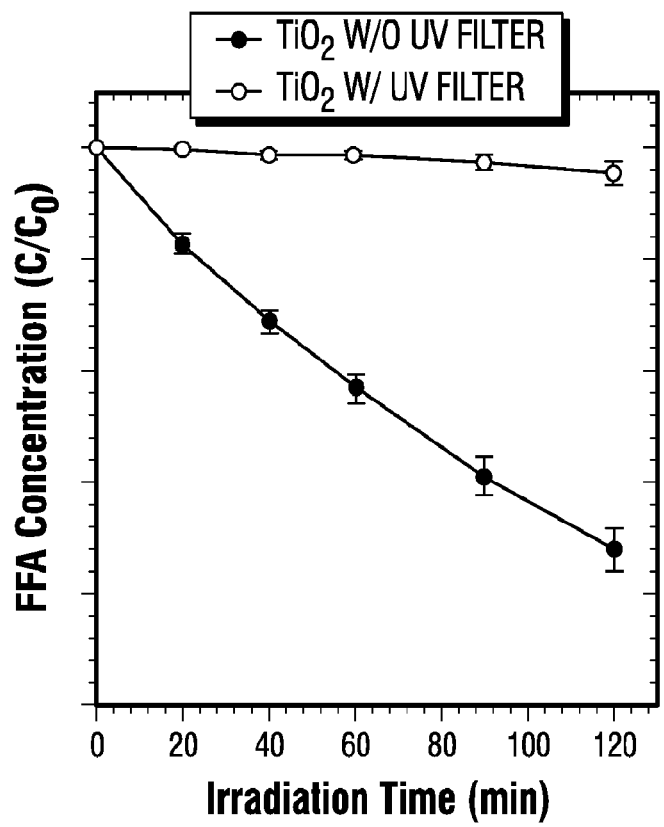
FIG. 15 shows illustrative plots of fractional FFA remaining as a function of irradiation time for $TiO_2$ in the presence and absence of a UV cutoff filter.

FIG. 14 shows illustrative plots of fractional FFA remaining as a function of irradiation time for various concentrations of silica-bound hexakis-substituted $C_{60}$ fullerene derivative 4 in the presence and absence of a UV cutoff filter. As shown by the comparable rates of FFA oxidation in the presence and absence of UV light, surface-bound hexakis-substituted $C_{60}$ fullerene derivative 4 was operable for singlet oxygen generation the presence of visible light. This behavior contrasts that observed for $TiO_2$ where very little FFA oxidation is observed in the absence of UV light, as shown in FIG. 15. FIG. 15 shows illustrative plots of fractional FFA remaining as a function of irradiation time for $TiO_2$ in the presence and absence of a UV cutoff filter. For hexakis-substituted $C_{60}$ fullerene derivative 4, singlet oxygen generation was facile at a relatively low intensity of 55 μw/cm².

Figure 16:
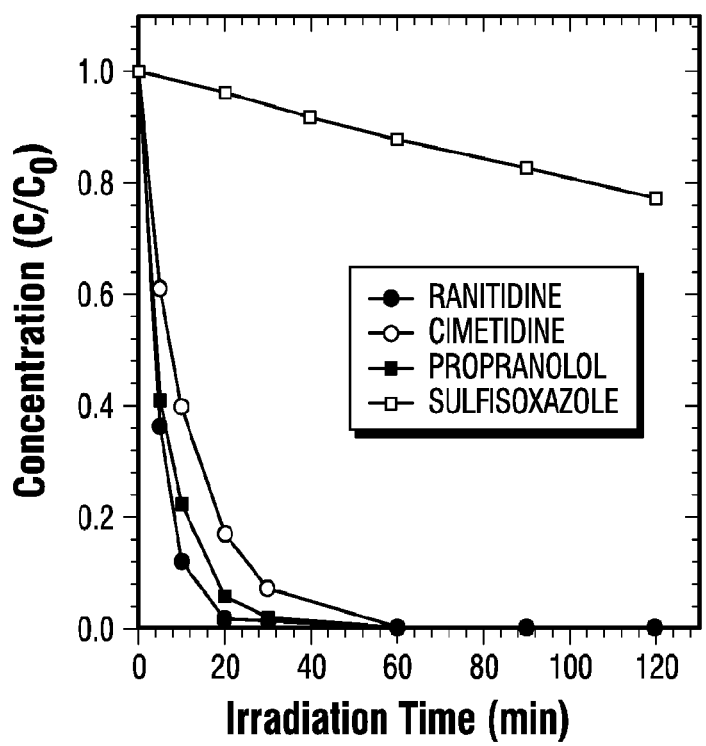
FIG. 16 shows illustrative plots of fractional concentration as a function of irradiation time for ranitidine, cimetidine, propanolol and sulfisoxazole in the presence of silica-bound hexakis-substituted $C_{60}$ fullerene derivative 4 at a light intensity of 55 µw/cm$^2$ (350 650 nm).

In addition to microbial and viral inactivation, the surface-bound hexakis-substituted $C_{60}$ fullerene derivative was active for removing chemical pollutants from a water source. Ranitidine, cimetidine, propanolol and sulfisoxazole are small molecule pharmaceutical compounds that are emerging as chemical pollutants in wastewater treatment protocols. FIG. 16 shows illustrative plots of fractional concentration as a function of irradiation time for ranitidine, cimetidine, propanolol and sulfisoxazole in the presence of silica-bound hexakis-substituted $C_{60}$ fullerene derivative 4 at a light intensity of 55 μw/cm² (350-650 nm). As shown in FIG. 16, the degradation of ranitidine, cimetidine and propanolol was essentially complete within one hour. Although, the degradation of sulfisoxazole was considerably slower, there was noticeable progression within two hours of irradiation.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. An aminofullerene derivative operable for photocatalytically generating singlet oxygen in the presence of a visible light source, wherein the aminofullerene derivative comprises:
   a fullerene cage; and
   a plurality of amine-terminated moieties covalently bonded to the fullerene cage,
      wherein the plurality of amine-terminated moieties comprise primary amines, and
      wherein the aminofullerene derivative is covalently bonded to a carboxylate-functionalized substrate surface by amide bonds between the primary amines of the fullerene cage and the carboxylate group bonded to the substrate surface.

2. The aminofullerene derivative of claim 1, wherein the fullerene cage comprises $C_{60}$.

3. The aminofullerene derivative of claim 2, wherein the aminofullerene derivative comprises a hexakis-substituted $C_{60}$ derivative.

4. The aminofullerene derivative of claim 3, wherein the hexakis-substituted $C_{60}$ derivative is

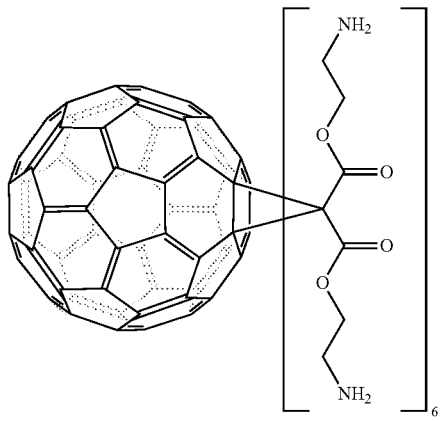

or a salt thereof.

5. The aminofullerene derivative of claim 2,
   wherein the aminofullerene derivative comprises $C_{60}$ and a plurality of amine-terminated moieties covalently bonded to the $C_{60}$, wherein the plurality of amine-terminated moieties comprise primary amines.

6. The aminofullerene derivative of claim 1, wherein the aminofullerene derivative comprises an aminofullerene having a structure of

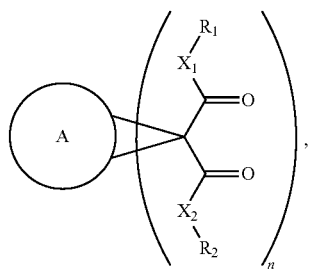

wherein A is a $C_{2m}$ fullerene cage;
   wherein m is an integer greater than or equal to 30;
   wherein $X_1$ and $X_2$ are independently selected from the group consisting of O and $NR_3$;

wherein $R_3$ is selected from the group consisting of H, alkyl, cycloalkyl, aryl, heteroaryl and aralkyl;

wherein $R_1$ and $R_2$ contain at least one terminal amino group and are independently selected from the group consisting of alkyl, alkenyl, alkynyl, cycloalkyl, heterocyclyl, aryl, heteroaryl and aralkyl groups; and wherein n is an integer ranging from 1 to an upper limit equal to half the number of hexagons in the $C_{2m}$ fullerene cage.

7. The aminofullerene derivative of claim 6, wherein A is $C_{60}$ and n is an integer ranging from 1 to 6.

8. The aminofullerene derivative of claim 1, wherein the primary amines comprise cationic amines.

9. The aminofullerene derivative of claim 1, wherein the carboxylate-functionalized substrate surface comprises silica.

* * * * *